United States Patent
Yairi et al.

(10) Patent No.: US 9,280,224 B2
(45) Date of Patent: *Mar. 8, 2016

(54) DYNAMIC TACTILE INTERFACE AND METHODS

(71) Applicant: Tactus Technology, Inc., Fremont, CA (US)

(72) Inventors: Micah B Yairi, San Carlos, CA (US); Craig Ciesla, Mountain View, CA (US); Nathaniel Mark Saal, Palo Alto, CA (US); Curtis Ray, Alamo, CA (US); Michael Hammersley, Redwood City, CA (US); Brandon Miller, Alameda, CA (US); Ben Calub, Hayward, CA (US); Carl Del Rosario, Sunnyvale, CA (US); Mario Garcia, Fremont, CA (US); Ron Menigoz, Pleasanton, CA (US); David Krevor, San Carlos, CA (US); Jonathan Jenkins, San Francisco, CA (US)

(73) Assignee: Tactus Technology, Inc., Fremont, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 14/035,851

(22) Filed: Sep. 24, 2013

(65) Prior Publication Data

US 2014/0132532 A1    May 15, 2014

Related U.S. Application Data

(60) Provisional application No. 61/705,053, filed on Sep. 24, 2012, provisional application No. 61/713,396, filed on Oct. 12, 2012.

(51) Int. Cl.
G06F 3/041    (2006.01)

(52) U.S. Cl.
CPC ...... *G06F 3/041* (2013.01); *G06F 2203/04103* (2013.01)

(58) Field of Classification Search
CPC .................. G06F 3/041; G06F 2203/04103
USPC ........ 345/156–178; 349/110, 155; 178/18.01; 434/114
See application file for complete search history.

(56) References Cited

U.S. PATENT DOCUMENTS

| | | | |
|---|---|---|---|
| 3,034,628 A | 5/1962 | Wadey | |
| 3,659,354 A | 5/1972 | Sutherland | |

(Continued)

FOREIGN PATENT DOCUMENTS

| | | |
|---|---|---|
| CN | 1260525 A | 7/2000 |
| CN | 1530818 A | 9/2004 |

(Continued)

OTHER PUBLICATIONS

Preumont, A. Vibration Control of Active Structures: An Introduction, Jul. 2011.

(Continued)

*Primary Examiner* — Prabodh M Dharia
(74) *Attorney, Agent, or Firm* — Jeffrey Schox

(57) ABSTRACT

A dynamic tactile interface includes: a substrate including a first transparent material and defining an attachment surface, an open channel opposite the attachment surface, and a fluid conduit intersecting the open channel and passing through the attachment surface; a tactile layer including a second transparent material and defining a tactile surface, a peripheral region bonded to the attachment surface opposite the tactile surface, and a deformable region adjacent the fluid conduit and disconnected from the attachment surface; a closing panel bonded to the substrate opposite the attachment surface and enclosing the open channel to define a fluid channel; a working fluid; and a displacement device configured to displace the working fluid into the fluid channel and through the fluid conduit to transition the deformable region from a retracted setting to an expanded setting.

22 Claims, 14 Drawing Sheets

(56) References Cited

U.S. PATENT DOCUMENTS

| | | | |
|---|---|---|---|
| 3,759,108 | A | 9/1973 | Borom et al. |
| 3,780,236 | A | 12/1973 | Gross |
| 3,818,487 | A | 6/1974 | Brody et al. |
| 4,109,118 | A | 8/1978 | Kley |
| 4,209,819 | A | 6/1980 | Seignemartin |
| 4,290,343 | A | 9/1981 | Gram |
| 4,307,268 | A | 12/1981 | Harper |
| 4,467,321 | A | 8/1984 | Volnak |
| 4,477,700 | A | 10/1984 | Balash et al. |
| 4,517,421 | A | 5/1985 | Margolin |
| 4,543,000 | A | 9/1985 | Hasenbalg |
| 4,584,625 | A | 4/1986 | Kellogg |
| 4,700,025 | A | 10/1987 | Hatayama et al. |
| 4,743,895 | A * | 5/1988 | Alexander ......... H03K 17/9622 341/33 |
| 4,772,205 | A | 9/1988 | Chlumsky et al. |
| 4,920,343 | A | 4/1990 | Schwartz |
| 4,940,734 | A | 7/1990 | Ley et al. |
| 5,194,852 | A | 3/1993 | More et al. |
| 5,195,659 | A | 3/1993 | Eiskant |
| 5,212,473 | A | 5/1993 | Louis |
| 5,222,895 | A | 6/1993 | Fricke |
| 5,286,199 | A | 2/1994 | Kipke |
| 5,346,476 | A | 9/1994 | Elson |
| 5,369,228 | A | 11/1994 | Faust |
| 5,412,189 | A | 5/1995 | Cragun |
| 5,459,461 | A | 10/1995 | Crowley et al. |
| 5,488,204 | A | 1/1996 | Mead et al. |
| 5,496,174 | A | 3/1996 | Garner |
| 5,666,112 | A | 9/1997 | Crowley et al. |
| 5,717,423 | A | 2/1998 | Parker |
| 5,729,222 | A | 3/1998 | Iggulden et al. |
| 5,742,241 | A | 4/1998 | Crowley et al. |
| 5,754,023 | A | 5/1998 | Roston et al. |
| 5,766,013 | A | 6/1998 | Vuyk |
| 5,767,839 | A | 6/1998 | Rosenberg |
| 5,835,080 | A | 11/1998 | Beeteson et al. |
| 5,880,411 | A | 3/1999 | Gillespie et al. |
| 5,889,236 | A | 3/1999 | Gillespie et al. |
| 5,917,906 | A | 6/1999 | Thornton |
| 5,943,043 | A | 8/1999 | Furuhata et al. |
| 5,977,867 | A | 11/1999 | Blouin |
| 5,982,304 | A | 11/1999 | Selker et al. |
| 6,067,116 | A | 5/2000 | Yamano et al. |
| 6,154,198 | A | 11/2000 | Rosenberg |
| 6,154,201 | A | 11/2000 | Levin et al. |
| 6,160,540 | A | 12/2000 | Fishkin et al. |
| 6,169,540 | B1 | 1/2001 | Rosenberg et al. |
| 6,187,398 | B1 | 2/2001 | Eldridge |
| 6,188,391 | B1 | 2/2001 | Seely et al. |
| 6,218,966 | B1 | 4/2001 | Goodwin et al. |
| 6,243,074 | B1 | 6/2001 | Fishkin et al. |
| 6,243,078 | B1 | 6/2001 | Rosenberg |
| 6,268,857 | B1 | 7/2001 | Fishkin et al. |
| 6,271,828 | B1 | 8/2001 | Rosenberg et al. |
| 6,278,441 | B1 | 8/2001 | Gouzman et al. |
| 6,300,937 | B1 | 10/2001 | Rosenberg |
| 6,310,614 | B1 | 10/2001 | Maeda et al. |
| 6,323,846 | B1 | 11/2001 | Westerman et al. |
| 6,337,678 | B1 | 1/2002 | Fish |
| 6,354,839 | B1 | 3/2002 | Schmidt et al. |
| 6,356,259 | B1 | 3/2002 | Maeda et al. |
| 6,359,572 | B1 | 3/2002 | Vale |
| 6,366,272 | B1 | 4/2002 | Rosenberg et al. |
| 6,369,803 | B2 | 4/2002 | Brisebois et al. |
| 6,384,743 | B1 | 5/2002 | Vanderheiden |
| 6,414,671 | B1 | 7/2002 | Gillespie et al. |
| 6,429,846 | B2 | 8/2002 | Rosenberg et al. |
| 6,437,771 | B1 | 8/2002 | Rosenberg et al. |
| 6,462,294 | B2 | 10/2002 | Davidson et al. |
| 6,469,692 | B2 | 10/2002 | Rosenberg |
| 6,486,872 | B2 | 11/2002 | Rosenberg et al. |
| 6,498,353 | B2 | 12/2002 | Nagle et al. |
| 6,501,462 | B1 | 12/2002 | Garner |
| 6,509,892 | B1 | 1/2003 | Cooper et al. |
| 6,529,183 | B1 | 3/2003 | Maclean et al. |
| 6,573,844 | B1 | 6/2003 | Venolia et al. |
| 6,636,202 | B2 | 10/2003 | Ishmael, Jr. et al. |
| 6,639,581 | B1 | 10/2003 | Moore et al. |
| 6,655,788 | B1 | 12/2003 | Freeman |
| 6,657,614 | B1 | 12/2003 | Ito et al. |
| 6,667,738 | B2 | 12/2003 | Murphy |
| 6,681,031 | B2 | 1/2004 | Cohen et al. |
| 6,683,627 | B1 | 1/2004 | Ullmann et al. |
| 6,686,911 | B1 | 2/2004 | Levin et al. |
| 6,697,086 | B2 | 2/2004 | Rosenberg et al. |
| 6,700,556 | B2 | 3/2004 | Richley et al. |
| 6,703,924 | B2 | 3/2004 | Tecu et al. |
| 6,743,021 | B2 | 6/2004 | Prince et al. |
| 6,788,295 | B1 | 9/2004 | Inkster |
| 6,819,316 | B2 | 11/2004 | Schulz et al. |
| 6,850,222 | B1 | 2/2005 | Rosenberg |
| 6,861,961 | B2 | 3/2005 | Sandbach et al. |
| 6,877,986 | B2 | 4/2005 | Fournier et al. |
| 6,881,063 | B2 | 4/2005 | Yang |
| 6,930,234 | B2 | 8/2005 | Davis |
| 6,937,225 | B1 | 8/2005 | Kehlstadt et al. |
| 6,975,305 | B2 | 12/2005 | Yamashita |
| 6,979,164 | B2 | 12/2005 | Kramer |
| 6,982,696 | B1 | 1/2006 | Shahoian |
| 6,995,745 | B2 | 2/2006 | Boon et al. |
| 7,027,032 | B2 | 4/2006 | Rosenberg et al. |
| 7,056,051 | B2 | 6/2006 | Fiffie |
| 7,061,467 | B2 | 6/2006 | Rosenberg |
| 7,064,655 | B2 | 6/2006 | Murray et al. |
| 7,079,111 | B2 | 7/2006 | Ho |
| 7,081,888 | B2 | 7/2006 | Cok et al. |
| 7,096,852 | B2 | 8/2006 | Gregorio |
| 7,102,541 | B2 | 9/2006 | Rosenberg |
| 7,104,152 | B2 | 9/2006 | Levin et al. |
| 7,106,305 | B2 | 9/2006 | Rosenberg |
| 7,106,313 | B2 | 9/2006 | Schena et al. |
| 7,109,967 | B2 | 9/2006 | Hioki et al. |
| 7,112,737 | B2 | 9/2006 | Ramstein |
| 7,113,166 | B1 | 9/2006 | Rosenberg et al. |
| 7,116,317 | B2 | 10/2006 | Gregorio et al. |
| 7,124,425 | B1 | 10/2006 | Anderson, Jr. et al. |
| 7,129,854 | B2 | 10/2006 | Arneson et al. |
| 7,131,073 | B2 | 10/2006 | Rosenberg et al. |
| 7,136,045 | B2 | 11/2006 | Rosenberg et al. |
| 7,138,977 | B2 | 11/2006 | Kinerk et al. |
| 7,138,985 | B2 | 11/2006 | Nakajima |
| 7,143,785 | B2 | 12/2006 | Maerkl et al. |
| 7,144,616 | B1 | 12/2006 | Unger et al. |
| 7,148,875 | B2 | 12/2006 | Rosenberg et al. |
| 7,151,432 | B2 | 12/2006 | Tierling |
| 7,151,527 | B2 | 12/2006 | Culver |
| 7,151,528 | B2 | 12/2006 | Taylor et al. |
| 7,154,470 | B2 | 12/2006 | Tierling |
| 7,158,112 | B2 | 1/2007 | Rosenberg et al. |
| 7,159,008 | B1 | 1/2007 | Wies et al. |
| 7,161,276 | B2 | 1/2007 | Face |
| 7,161,580 | B2 | 1/2007 | Bailey et al. |
| 7,168,042 | B2 | 1/2007 | Braun et al. |
| 7,176,903 | B2 | 2/2007 | Katsuki et al. |
| 7,182,691 | B1 | 2/2007 | Schena |
| 7,191,191 | B2 | 3/2007 | Peurach et al. |
| 7,193,607 | B2 | 3/2007 | Moore et al. |
| 7,195,170 | B2 | 3/2007 | Matsumoto et al. |
| 7,196,688 | B2 | 3/2007 | Schena |
| 7,198,137 | B2 | 4/2007 | Olien |
| 7,199,790 | B2 | 4/2007 | Rosenberg et al. |
| 7,202,851 | B2 | 4/2007 | Cunningham et al. |
| 7,205,981 | B2 | 4/2007 | Cunningham |
| 7,208,671 | B2 | 4/2007 | Chu |
| 7,209,028 | B2 | 4/2007 | Boronkay et al. |
| 7,209,113 | B2 | 4/2007 | Park |
| 7,209,117 | B2 | 4/2007 | Rosenberg et al. |
| 7,209,118 | B2 | 4/2007 | Shahoian et al. |
| 7,210,160 | B2 | 4/2007 | Anderson, Jr. et al. |
| 7,215,326 | B2 | 5/2007 | Rosenberg |
| 7,216,671 | B2 | 5/2007 | Unger et al. |
| 7,218,310 | B2 | 5/2007 | Tierling et al. |
| 7,218,313 | B2 | 5/2007 | Marcus et al. |

(56) References Cited

U.S. PATENT DOCUMENTS

| | | | |
|---|---|---|---|
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 * | 11/2008 | Poynter ............... G06F 3/04886 345/168 |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |

(56) References Cited

U.S. PATENT DOCUMENTS

| | | |
|---|---|---|
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1* | 12/2005 | Funaki ................ G06F 3/04886 345/173 |
| 2006/0026521 A1 | 2/2006 | Hotelling et al. |
| 2006/0026535 A1* | 2/2006 | Hotelling ............. G06F 3/0418 715/863 |
| 2006/0053387 A1* | 3/2006 | Ording ................ G06F 3/04883 715/773 |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1* | 7/2009 | Ciesla ............................ 345/173 |
| 2009/0174687 A1* | 7/2009 | Ciesla ................ G06F 3/04886 345/174 |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1* | 10/2009 | Perlin et al. .................... 345/174 |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1* | 4/2010 | Ciesla et al. ................... 345/174 |

(56) References Cited

U.S. PATENT DOCUMENTS

| | | |
|---|---|---|
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1* | 7/2010 | Craig .................. G06F 3/0202 345/173 |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0225456 A1* | 9/2010 | Eldering .................. G06F 3/041 340/407.2 |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0120784 A1 | 5/2011 | Osoinach et al. |
| 2011/0148793 A1* | 6/2011 | Ciesla et al. .................. 345/173 |
| 2011/0148807 A1 | 6/2011 | Fryer |
| 2011/0157056 A1 | 6/2011 | Karpfinger |
| 2011/0157080 A1* | 6/2011 | Ciesla et al. .................. 345/174 |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0091834 A1 | 4/2015 | Johnson |
| 2015/0205419 A1 | 7/2015 | Calub et al. |
| 2015/0293591 A1* | 10/2015 | Yairi .................. G06F 3/016 345/173 |

FOREIGN PATENT DOCUMENTS

| | | |
|---|---|---|
| CN | 1882460 A | 12/2006 |
| EP | 2000884 A1 | 12/2008 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| KR | 20000010511 | 2/2000 |
| KR | 100677624 B | 1/2007 |
| WO | 2004028955 A | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

Jeong et al., "Tunable Microdoublet Lens Array," Optical Society of America, Optics Express; vol. 12, No. 11. May 31, 2004, 7 Pages.

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

* cited by examiner

DYNAMIC TACTILE INTERFACE AND METHODS

CROSS-REFERENCE TO RELATED APPLICATIONS

This application claims the benefit of U.S. Provisional Application No. 61/705,053, filed on 24 Sep. 2012, and U.S. Provisional Application No. 61/713,396, filed on 12 Oct. 2012, both of which are incorporated in their entireties by the reference.

TECHNICAL FIELD

This invention relates generally to the field of touch-sensitive displays, and more specifically to a dynamic tactile interface and methods for touch-sensitive displays.

DESCRIPTION OF THE EMBODIMENTS

The following description of the embodiments of the invention is not intended to limit the invention to these embodiments, but rather to enable any person skilled in the art to make and use this invention.

1. First Dynamic Tactile Interface

Figure 1A:
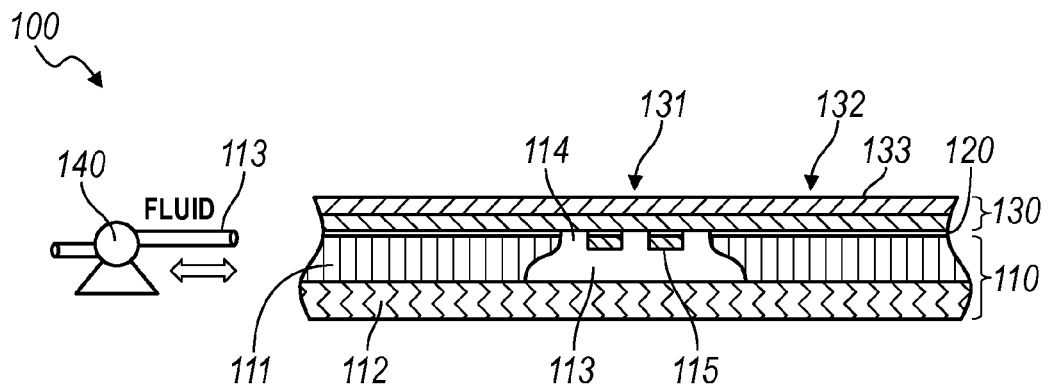
FIGS. 1A and 1B are schematic representations of a first dynamic tactile interface of the invention.
Figure 1B:
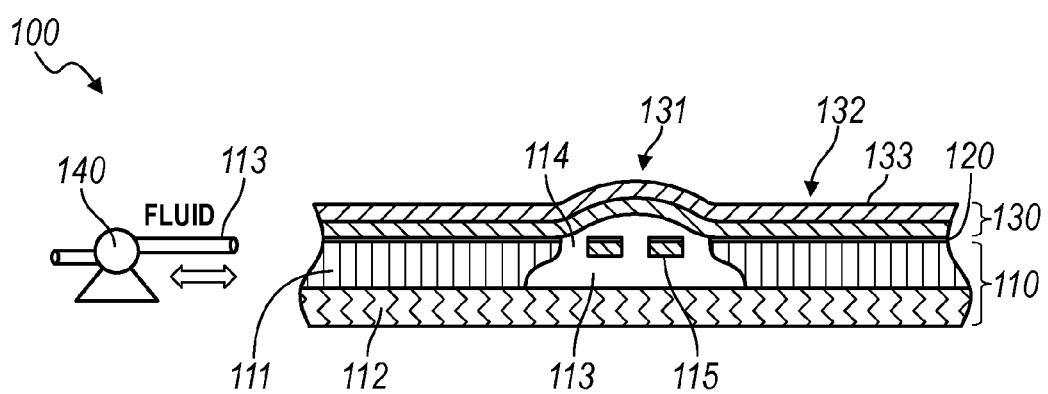

As shown in FIGS. 1A and 1B, a first dynamic tactile interface 100 includes: a substrate 110, a tie layer 120, a tactile layer 130, and a displacement device 140. The substrate no defines an attachment surface 116, a support surface 115 continuous with the attachment surface 116, a fluid channel 113, and a fluid conduit 114 configured to communicate fluid from the fluid channel 113 through the support surface 115. The tie layer 120 is deposited onto the attachment surface 116. The tactile layer 130 includes a peripheral region 132 bonded to the tie layer 120, includes a deformable region 131 adjacent the support surface 115 and disconnected from the tie layer 120, and defines a tactile surface 133 opposite the substrate no. The displacement device 140 is configured to displace fluid into the fluid channel 113 to transition the deformable region 131 from a retracted setting to an expanded setting, wherein the tactile surface 133 at the deformable region 131 is flush with the tactile surface 133 at the peripheral region 132 in the retracted setting (shown in FIG. 1A) and is offset from the surface at the peripheral region 132 in the expanded setting (shown in FIG. 1B).

Generally, the first dynamic tactile interface 100 can be incorporated or applied over a display and/or over a computing device, such as a smartphone or a tablet, and define one or more deformable regions of a tactile layer that can be selectively expanded and retracted to intermittently provide tactile guidance to a user interacting with the computing device. In one implementation, the first dynamic tactile interface 100 is integrated into a touchscreen of a mobile computing device, and the first dynamic tactile interface 100 can include a set of round or rectangular deformable regions, each deformable region substantially aligned with a key of a virtual keyboard displayed on the mobile computing device. In this implementation, the deformable regions can thus mimic physical hard keys when in the expanded setting, but when the keyboard is not displayed on the mobile computing device, the deformable regions can retract to yield a uniform, flush tactile layer. In this implementation, the first dynamic tactile interface 100 can also include an elongated deformable region that, in the expanded setting, aligns with a virtual 'swipe-to-unlock' input region rendered on the display 180, and the elongated deformable region in the expanded setting can thus provide tactile guidance to a user unlocking the mobile computing device. The elongated deformable region can subsequently transition into the retracted setting to yield a uniform, flush surface over the display 180, such as once the mobile computing device is unlocked and the 'swipe-to-unlock' input region is no longer rendered on the display 180.

Because the first dynamic tactile interface 100 can be implemented over a display, elements of the first dynamic tactile interface 100, such as the substrate no, the tie layer (e.g., a silicon oxide film), and the tactile layer 130, can be substantially transparent to enable light transmission therethrough. Similarly, features of the first dynamic tactile interface 100, such as the fluid channel 113, the fluid conduit 114, and a drainage hole 117 (described below and shown in FIG. 10D), can be substantially small and/or of suitable geometries to substantially minimize reflection, refraction, and/or diffraction of light output from the display 180 through the first dynamic tactile interface 100, thereby limiting optical distortions perceived by a user (e.g., up to a 'just noticeable' difference at a typical viewing distance of twelve inches from the display 180. The substrate 110, the silicon oxide layer, the tactile layer 130, fluid, and/or other components of the first dynamic tactile interface 100 can also be of similar indices of refraction (e.g., at an average wavelength of light in the visible spectrum) or can share similar chromatic dispersion or other optical properties.

The substrate no of the first dynamic tactile interface 100 defines the fluid channel 113 that is connected to the fluid conduit 114, wherein the fluid conduit 114 is configured to communicate fluid from the fluid channel 113 through the attachment surface 116. The substrate 110 can be substantially planar and substantially rigid and therefore can retain the peripheral region 132 of the tactile layer 130 in substantially planar form in and between the expanded and retracted settings. However, the substrate no can be of any other form, such as curvilinear, convex, or concave, and the substrate no can also be flexible.

The substrate no can be of acrylic (Poly(methyl methacrylate) or PMMA) such that the substrate no is substantially translucent. However, the substrate no can alternatively be surface-treated or chemically-altered PMMA, glass, chemically-strengthened alkali-aluminosilicate glass, polycarbonate, acrylic, polyvinyl chloride (PVC), glycol-modified polyethylene terephthalate (PETG), polyurethane, a silicone-based elastomer, or any other suitable translucent or transparent material or combination thereof. Alternatively, the substrate no can be opaque, such as for arrangement over an off-screen region of a mobile computing device. The substrate 110 can also be of various different materials. For example, the substrate no can include a glass base sublayer bonded to a fluid channel and fluid conduit formed of PMMA. The substrate 110 can also be of a material exhibiting adequate adhesion properties with tie layer (e.g., a silicon oxide film) such that the tie layer 120 deposited onto the attachment surface 116 can function to retain the peripheral region 132 of the tactile layer 130 against the substrate 110 despite the position of the deformable region 131 or the fluid pressure between the substrate 110 and the deformable region 131. For example, adhesion the tie layer and the substrate and between the tie layer and the tactile layer can be enhanced with surface treatments, such as described below. The tie layer can also include a multiple layers and/or include a thin metallic layer a few angstroms thick.

The fluid channel 113 can be a blind channel defined within the substrate no. In one variation of the first dynamic tactile interface 100 shown in FIGS. 1A and 1B, the substrate no includes a first sublayer 111 and a second sublayer 112 that, when joined, cooperate to define and to enclose the fluid channel 113. The first sublayer 111 can define the attachment surface 116, and the fluid conduit 114 can pass through the first sublayer 111 to the attachment surface 116. In this variation, the first and second sublayers, can be of the same or similar materials, such as PMMA for both sublayers or surface-treated PMMA for the first sublayer 111 and standard PMMA for the second sublayer 112.

The fluid channel 113 can be one of a set of fluid channels that communicate fluid to one or more fluid conduits of the deformable region 131. Fluid channels in the set of fluids channels can also intersect, such as in the vicinity of the deformable region 131. Implementation of multiple channels feeding fluid to the deformable region 131 can increase flow rate to or from the deformable region 131, thus yielding faster transitions between retracted and expanded settings. This can additionally or alternatively enable implementation of fluid channels of smaller cross-sectional areas, which may be less visible to a user. Multiple fluid channels can be incorporated into a system configured to independently expand one or more deformable regions simultaneously.

Figure 9A:
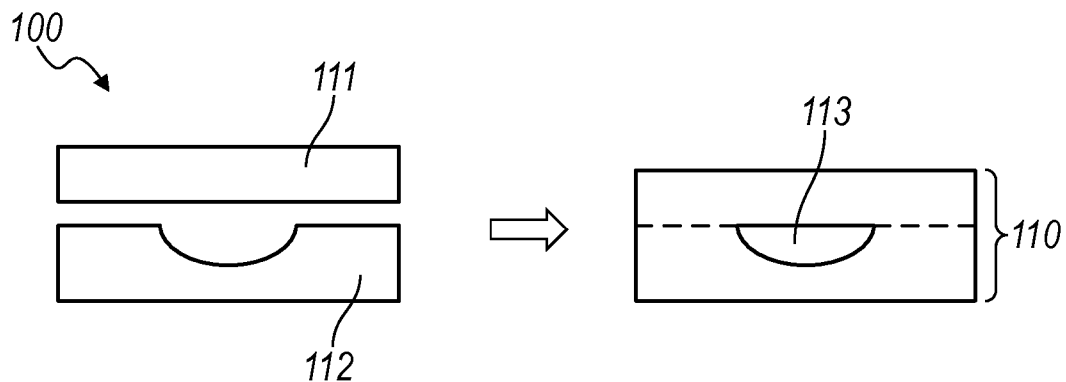
FIGS. 9A, 9B, and 9C are schematic representations of variations of the first dynamic tactile interface.
Figure 9B:
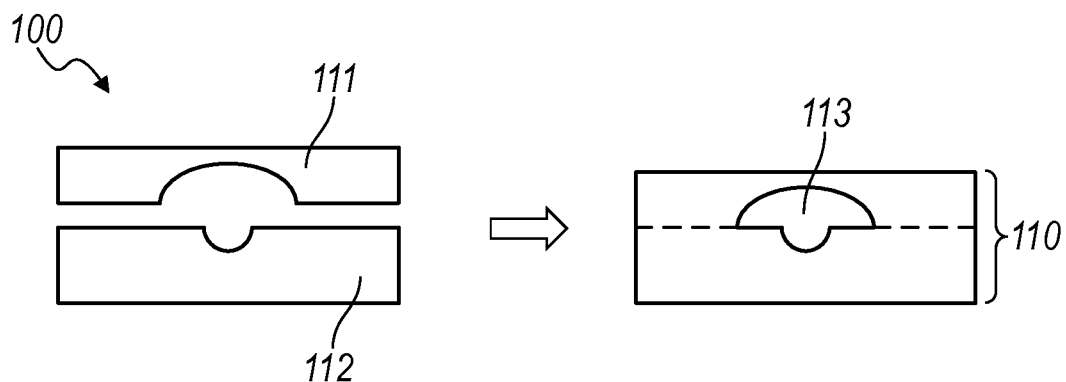
Figure 9C:
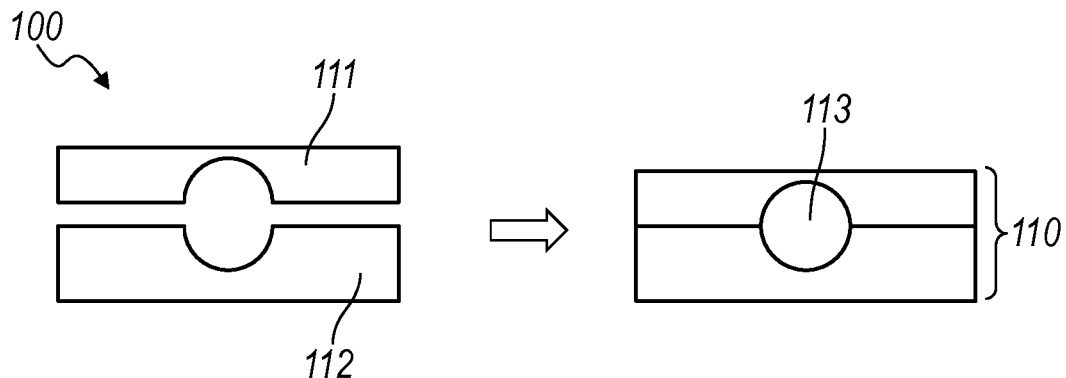

As shown in FIG. 9A, the fluid channel 113 can be created by forming (or cutting, stamping, casting, etc.) an open channel in the first sublayer 111 of the substrate 110 and then enclosing the channel with a second sublayer 112 (without a channel feature) to form the enclosed fluid channel and the substrate 110. Alternatively, as shown in FIGS. 9A and 9B, the substrate can include two sublayers, including a first sublayer 111 defining an upper open channel section and including a second sublayer 112 defining a lower open channel that cooperates with the upper open channel to define the fluid channel 113 when the first and second sublayers 111,112 are aligned and joined. For example, each sublayer can include a semi-circular open channel, wherein, when bonded together, the sublayers form an enclosed fluid channel with a circular cross-section, as shown in FIG. 9C. Because small cross-sections may affect fluid flow rate through the fluid channel 113, this fluid channel geometry may enable higher flow rates than other cross-sections. However, the substrate 110 can define a fluid channel of any suitable cross-section, such as square, rectangular, circular, semi-circular, ovular, etc.

Figure 8A:
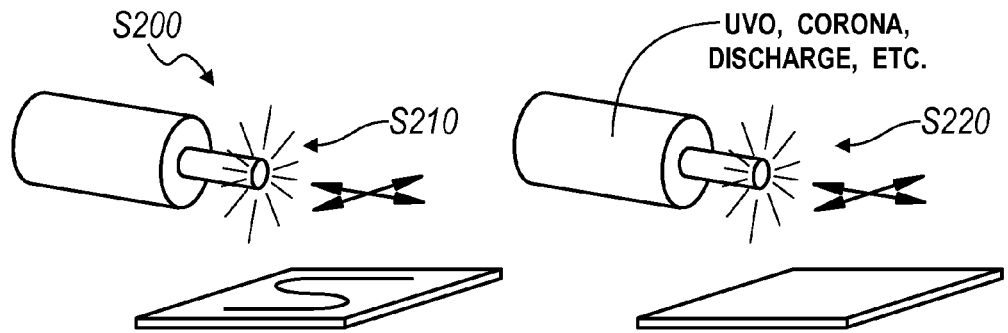
FIGS. 8A, 8B, and 8C are schematic representations of variations of the first method.

In one example implementation, the fluid channel 113 and the fluid conduit 114 are cut into the first sublayer 111 opposite the attachment surface 116 via conventional machining. The first and second sublayers, can then be treated and surface activated in ultraviolet ozone for a specified period of time (e.g., several minutes), as shown in FIG. 8A. The first and second sublayers, can then be stacked in alignment on a compression fixture (shown in FIG. 8B) and compressed according to a time, temperature, and pressure schedule (shown in FIG. 8C), such as one hour at 300 psi of compression at a temperature of 50° C. The stack can also be compressed according to an environment schedule throughout a portion or all of the compression cycle, such as an environment that is dry argon, wet hydrogen (i.e., hydrogen mixed with small quantities of air or water), or vacuum (e.g., $10^{-6}$ Torr). The stack can additionally or alternatively be laminated in a compression machine (e.g., with rollers) that bonds the layers of the stack by applying pressure and/or heat across portions of the stack over time.

The first dynamic tactile interface 100 can also include multiple substrates, each defining one or more fluid channels and vias, such as shown and described in U.S. patent application Ser. No. 12/652,704, filed on 5 Jan. 2010, which is incorporated in its entirety by this reference. In this implementation, substrates can be stacked with vias in alignment to enable communication of fluid across multiple substrate layers, and the stack of substrates can then be bonded according to any of the foregoing or forthcoming methods or techniques.

The compression fixture implemented in the foregoing example implementation can be a two-part fixture including a cope side and a drag side. Each of the cope and drag sides can include a bonding surface and a support surface that supports the bonding surface via one or more flexures, as shown in FIG. 8. In this example implementation, the sheet materials that define the substrate 110 and the tactile layer 130 can extend beyond the compression portions of the compression fixture (e.g., beyond the flexure), which can reduce distortion of the substrate no and tactile layer proximal the boundary of the compression portions of the compression fixture. Furthermore, alignment features integral with the sheet materials that define the substrate no and the tactile layer 130 can be arranged beyond the portions of the materials within the compression portions of the compression fixture. Each side of the compression fixture also can include a recess with geometry, form, and width correlating with and/or substantially similar to that of the fluid channel 113 such the stack can be set between the cope and drag plates and compressed without collapsing the fluid channel 113. The cope and/or drag plates can also include locating features that align the stack with the recess. Furthermore, the drag side can include at least one male locating feature, and the cope side can include at least one female locating feature such that the halves of the compression fixture can be repeatably aligned.

In the foregoing example implementation, the first sublayer of the substrate 110 can include an open valley opposite the attachment surface 116, wherein the open valley substantially defines the fluid channel 113 when the first and second sublayers are joined. The first sublayer 111 also can include at least one through-bore that passes from a portion of the fluid channel 113 to the attachment surface 116 such that the fluid channel 113 and fluid conduit can be formed in the first sublayer 111 substantially simultaneously and/or in the same manufacturing setup. However, in this or other manufacturing implementations, the fluid channel 113 and/or fluid conduit can be created in the substrate 110 (e.g., in the second sublayer 112 and/or in the first sublayer 111) via any suitable manufacturing technique, such as by etching, drilling, punching, stamping, molding, casting, etching, bulk micromachining, or any other suitable manufacturing process. Furthermore, the first and second sublayers, can be cleaned, treated, and/or activated via any other process, or combination of processes, such as via low-temperature heating in a vacuum, via etching, or via a solvent wipe. The stack can also be compressed according to any other time, temperature, pressure, and/or environment schedule. Following assembly, the stack can be further post-annealed, such as by heating the stack according to a particular time, temperature, and/or environment schedule to modify the crystalline (e.g., grain) structure with the layers of the stack.

Figure 7:
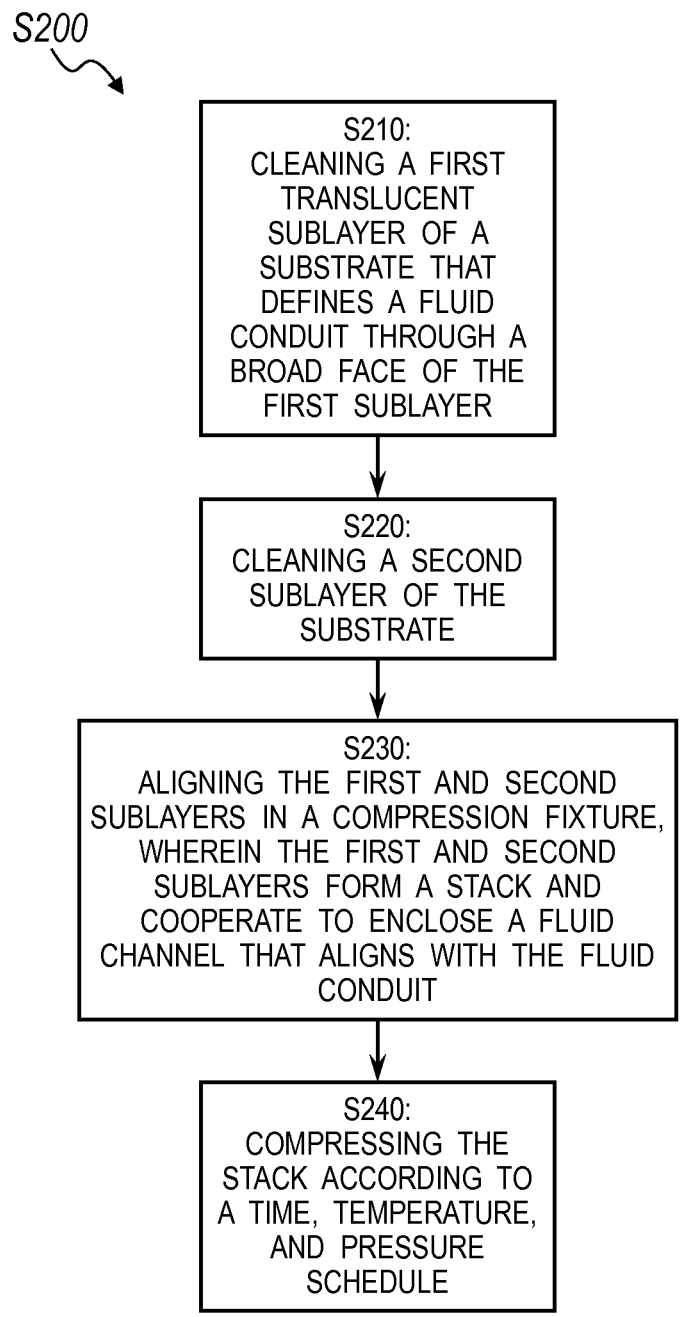
FIG. 7 is a flowchart representation of a first method of one embodiment of the invention.
Figure 8B:
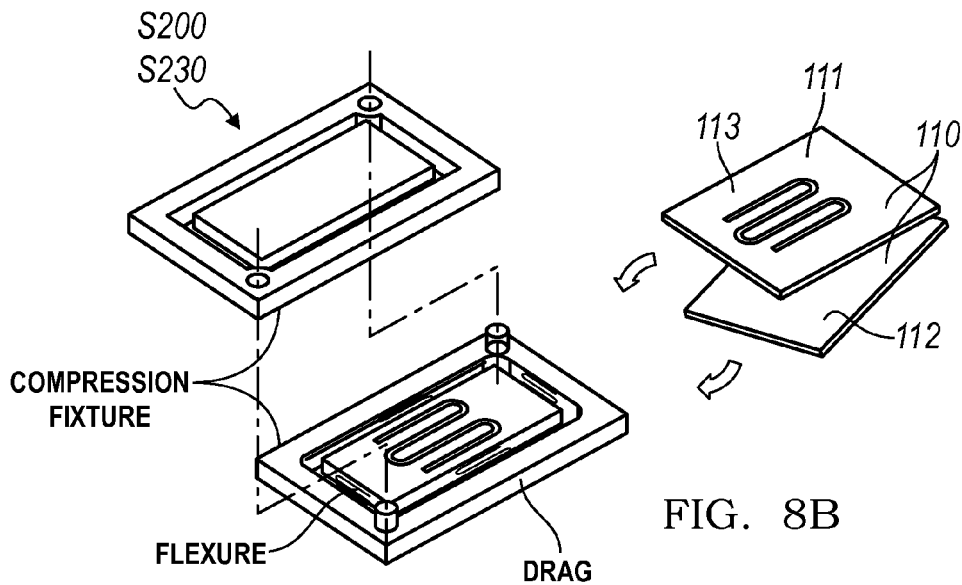
Figure 8C:
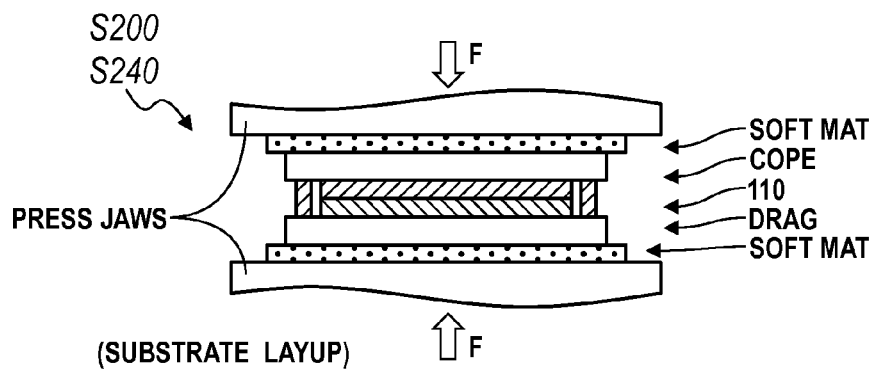

Therefore, as shown in FIG. 7, a first method S100 for enclosing a fluid channel 113 within a substrate 110 includes: cleaning a first translucent sublayer of the substrate 110 that defines a fluid conduit 114 through a broad face of the first sublayer 111 as shown in FIG. 8A as Block S110; cleaning a second sublayer 112 of the substrate 110 as shown in FIG. 8B as Block S120; aligning the first and second sublayers 111, 112 in a compression fixture, wherein the first and second sublayers in, 112 form a stack and cooperate to enclose the fluid channel 113 that aligns with the fluid conduit 114 as shown in FIG. 8C as Block S130; and compressing the stack according to a time, temperature, and pressure schedule as shown in FIG. 8D as Block S140.

The first method S100 can be implemented to join the first and second sublayers 111, 112 of the substrate 110 of the first dynamic tactile interface 100, as described above. The first method S100 can therefore also include curing the sublayer stack according to a time, temperature, pressure, and environment schedule. However, the first method S100 can include any other procedure implemented in any other way to enclose the fluid channel 113 within the substrate 110.

Figure 4:
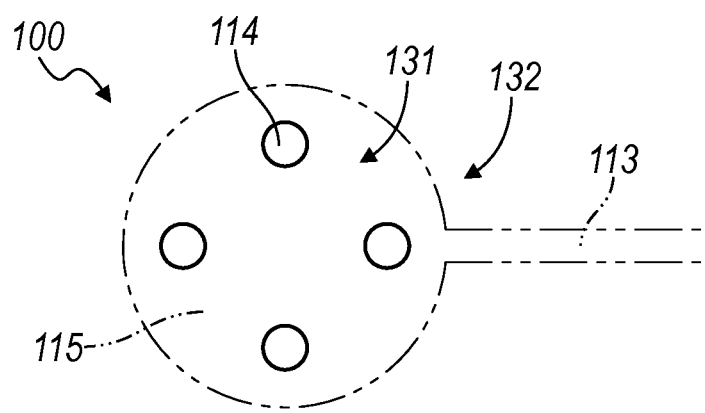
FIG. 4 is a schematic representation of one variation of the first dynamic tactile interface.

As shown in FIGS. 1 and 4, the substrate 110 can further define a support surface 115 adjacent the deformable region 131, wherein the support surface 115 defines a hard stop for the tactile layer 130 that resists inward deformation of the deformable region 131 due to an input on the tactile surface 133. The support surface 115 can further be in-plane with the attachment surface 116 proximal the peripheral region 132 such that the support surface 115 resists inward deformation of the deformable region 131 past the plane of the peripheral region 132, though the support surface 115 can be of any other geometry or form. The fluid conduit 114 can pass through the support surface 115 such that the fluid conduit 114 can communicate fluid from the fluid channel 113 to the interior surface of the tactile layer 130 to transition the deformable region 131 between settings.

The fluid channel 113 can be defined as an elongated recess of constant cross-section and depth through the substrate no. The cross-section of the fluid channel 113 can be rectilinear, though the cross-section of the fluid channel 113 can alternatively be circular, semi-circular, curvilinear, ovular, triangular, trapezoidal, elliptical, or any other suitable cross-section. The fluid channel 113 also can include a series of orthogonal linear segments that meet at arcuate or filleted sections (shown in FIG. 3) to form a serpentine path configured to communicate fluid to a plurality of adjacent deformable regions separated by peripheral regions. The substrate 110 can also define the fluid channel 113 that is of varying cross section along its length, such as varying width, constant-width with oscillating profile along the length of the fluid channel 113, or a sinusoidal, waveform, or 'squiggle' oscillating profile. The cross-section (e.g., geometry, height, width, etc.) of the fluid channel 113 (and/or fluid conduit) can be tailored for particular speed and/or pressure of fluid flow at one or more particular regions along the length of the fluid channel 113. Furthermore, the substrate 110 can also define the fluid channel 113 that is an open channel or a sunk (e.g., buried) channel, or the substrate no can define the fluid channel 113 in any other suitable way. However, the fluid channel 113 can be of any other constant or varying depth, any other constant or varying cross-section, linear or non-linear path, linear or non-linear profile, or of any other geometry, profile, form, or path.

Figure 11A:
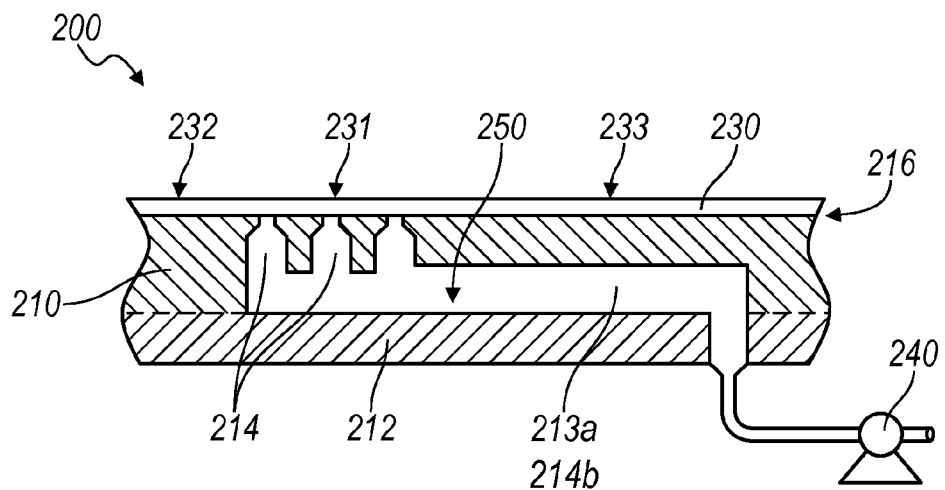
FIGS. 11A and 11B are schematic representations of a second dynamic tactile interface of the invention.
Figure 11B:
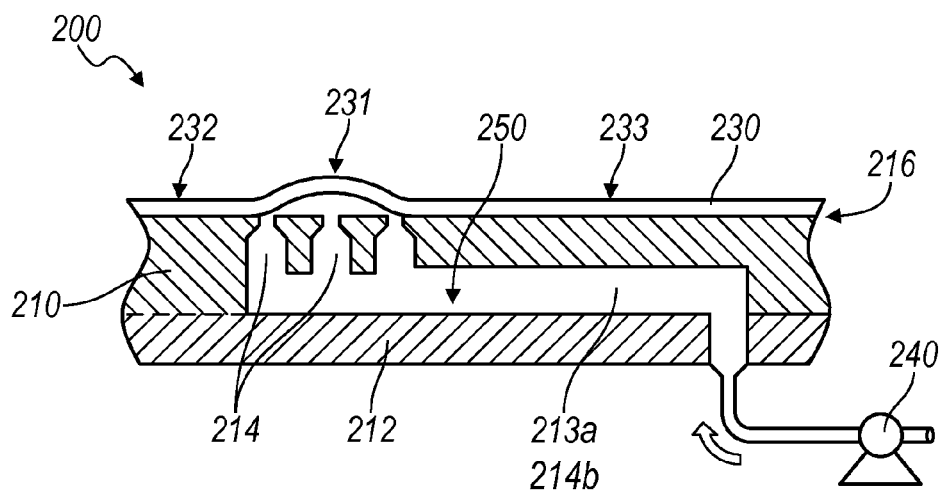

The fluid conduit 114 can be circular in cross-section and normal to the attachment surface 116 or of any other profile and/or cross-section. The fluid conduit 114 can also be one in a set of fluid conduits paired with the deformable region 131, wherein the set of fluid conduits cooperate to direct fluid between the fluid channel 113 and the interior surface of the tactile layer 130. Furthermore, the cross-sectional area of the fluid conduit 114 at the attachment surface 116 can be less than the cross-sectional area of the fluid channel 113 at the junction with the fluid conduit 114, such as shown in FIGS. 11A and 11B. However, the fluid conduit 114 can be of any other form, geometry, or profile.

The substrate no can further define one or more drainage holes 117 fluidly coupled to the fluid conduit 114 and to the fluid channel 113. The drainage holes 117 can be in fluid communication with the back surface of the deformable region 131 and adjacent the fluid conduit 114. For example, the fluid conduit 114 can define an outlet substantially proximal the center of the deformable region 131 and the drainage hole 117 can define a fluid inlet substantially proximal and within the boundary of the deformable region 131, and the outlet of the drainage hole 117 can be coupled to the fluid channel 113 to communicate fluid back into the fluid channel 113. Furthermore, the cross-section of the drainage holes 117 can be substantially smaller than the cross-section of the fluid conduit 114 such that the fluid conduit 114 defines a primary fluid path to communicate fluid toward and away from the back surface of the deformable region 131. The drainage hole 117 can thus function to permit additional fluid, trapped under the deformable button during a transition to the retracted setting, to passively escape a fluid cavity between the substrate 110 and the back surface of the deformable region 131. This can enable more complete drainage of fluid from the cavity and thus a more predictable and/or consistent form of the deformable region 131 in the retracted setting. Generally, the fluid can be actively pumped into and/or out of the fluid cavity via the fluid conduit 114 to transition the deformable region 131 between expanded and retracted settings, and fluid can passively move out of the cavity via the drainage holes 117 to improve efficacy of transitions into the retracted setting. However, the drainage hole 117 can additionally or alternatively be coupled to a drainage source that actively draws fluid out of the fluid cavity to actively retract the deformable region 131, though the drainage hole 117 can function in any other suitable way.

Figure 10A:
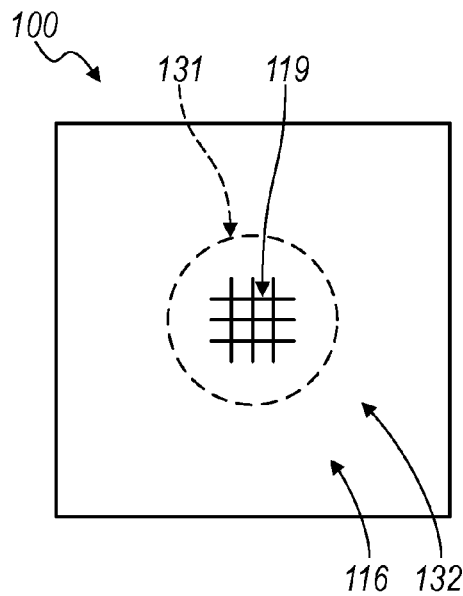
FIGS. 10A, 10B, 10C, and 10D are schematic representations of variations of gothe first dynamic tactile interface.
Figure 10B:
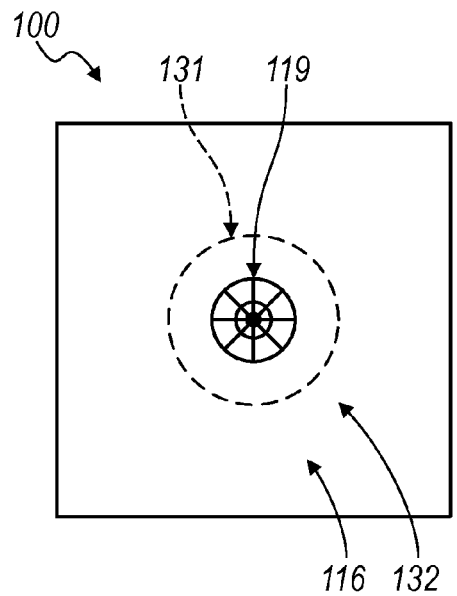
Figure 10C:
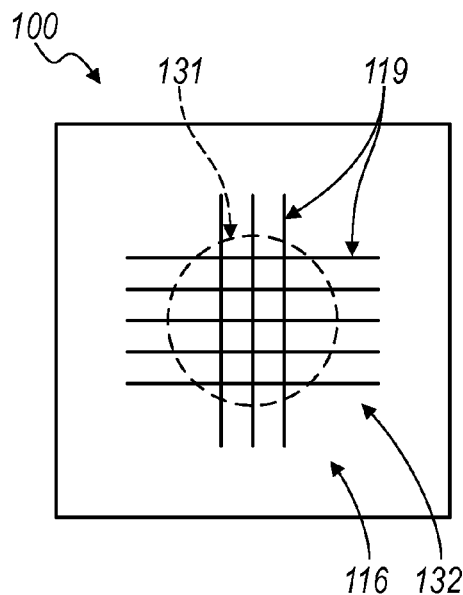
Figure 10D:
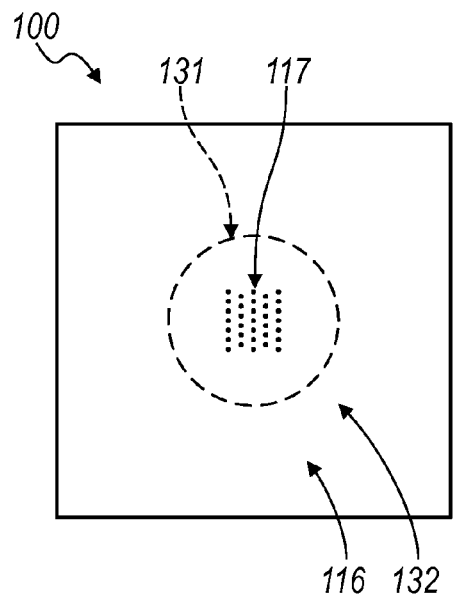

As shown in FIGS. 10A-10C, the attachment surface 116 can also define one or more grooves 119 that provide additional paths for fluid to flow into or out of the fluid conduit 114 and/or drainage holes 117 during a transition between the retracted and expanded settings. Like the drainage hole 117, grooves 119 can assist removal of fluid from the fluid cavity and thus prevent fluid from being trapped between the tactile layer 130 and the substrate 110. The grooves 119 can be shallow, deep, narrow, wide, or of any other constant or varying cross-section or geometry and can also feature microtexturing or other suitable surface treatment or profile. The grooves 119 can extend only over the portion of the substrate 110 adjacent the deformable region 131 (shown in FIGS. 10A and 10B) or into the peripheral region 132 (shown in FIG. 10C). The substrate 110 can define multiple grooves, such as grooves that intersect across the portion of the substrate 110 adjacent the deformable region 131 of the tactile layer 130, such as in a checkerboard pattern (shown in FIGS. 10A and 10C), a pattern of radiating lines and concentric circles (shown in FIG. 10B), or randomly arranged linear or nonlinear grooves. The back surface of the tactile layer 130 can also define ridges that align with and substantially dip into or fill the groove(s) in the retracted setting. Alternatively, the back surface of the tactile layer 130 can define one or more grooves, and the attachment surface 116 can also define one or more ridges that align with and fill one or more grooves in the tactile layer 130 in the retracted setting.

The form, profile, surface finish, and/or geometry of the fluid conduit 114 and the fluid channel 113 can be selected to limit optical distortion of an image transmitted through the substrate no, such as scattering, diffraction, refraction, or reflection. These variables can also be tailored to inhibit unwanted back-reflection of impinging light, such as from an external light source or the sun. Furthermore, these variables can also be tailored to limit directional or preferential light scattering in a particular direction in favor of even distribution of light scattering or refraction through the substrate no and the tactile layer 130. The fluid channel 113 and fluid conduit can further include concave or convex fillets of constant or varying radii at any edge, corner, or apex such that unwanted optical distortion, such as scattering, reflection, refraction, and/or diffraction, can be minimized at such features. Additionally or alternatively, the fluid channel 113 and/or fluid conduit can be of a substantially small cross-sectional area that reduces light scattering at a fluid-substrate boundary or interface. The fluid channel 113, fluid conduit, and tactile layer can also be substantially clean before the first dynamic tactile interface 100 is filled with fluid in order to promote wetting and/or to minimize nucleation sites (e.g., for bubbles) throughout the fluid path(s) within the first dynamic tactile interface 100. Air can also be evacuated from the fluid channel 113, fluid conduit, and tactile layer can also be prior to filling the first dynamic tactile interface 100 with fluid. The fluid channel 113 and/or fluid conduit can also be hydrophobic or hydrophilic. The geometry and/or the minimal cross-sectional area of the fluid conduit 114 and the fluid channel 113 can render the fluid conduit 114 and the fluid channel 113 substantially optically imperceptible to a user. The geometry and/or the minimal cross-sectional area of the fluid conduit 114 and the fluid channel 113 can also limit optical distortion through the substrate 110 to less than a just noticeable difference, such as at a typical working distance of twelve inches between the tactile surface 133 and an eye of a user. Generally, the geometry and/or minimal cross-sectional area of the fluid paths can yield the benefit of limiting optical abnormalities of the first dynamic tactile interface 100 below a just noticeable difference.

Figure 6A:
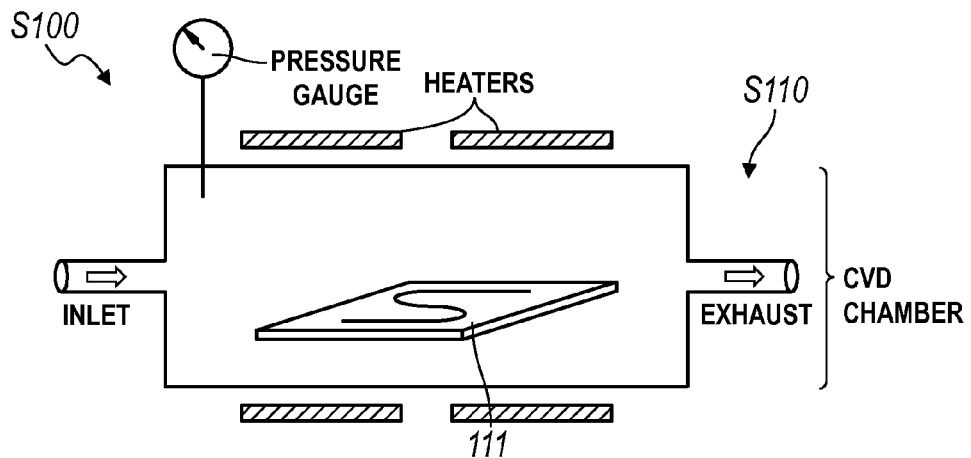
FIGS. 6A-6E are schematic representations of variations of the second method.

The tie layer 120 of the first dynamic tactile interface 100 is deposited on the attachment surface 116. The tie layer 120 can function as an activatable adherent that chemically and/or mechanically bonds the substrate 110 to the tactile layer 130. For example, the tie layer 120 can include a silicon oxide film applied to the attachment surface 116 of the substrate 110 via a chemical vapor deposition process, as shown in FIG. 6A. Alternatively, the tie layer 120 can be applied via sputtering, plasma polymerization, mechanical application via a rolling drum, or any other suitable process that yields a silicon oxide film of substantially even thickness across the attachment surface 116. The thickness of the tie layer 120 can be sufficiently thin such that a person interacting with the dynamic tactile interface 100 finds difficulty in distinguishing the tie layer 120 by sight and/or by feel. For example, the tie layer 120 can be less than one micrometer (1 μm) in thickness.

The tie layer 120 can be selectively applied to the attachment surface 116. In one example implementation, prior to application of the film, a weighted (or magnetized) shield is placed over the portion of the attachment surface 116, the shield covering a particular area that will be adjacent to the deformable region 131, wherein the shield prevents deposition of silicon oxide over the substrate 110 at the particular area. In another example implementation, prior to application of the film, a sticker-type mask is selectively adhered to the attachment surface 116, specifically at portions that will be aligned with deformable regions of the tactile layer 130. Alternatively, the tie layer 120 can be applied across the attachment surface 116 and subsequently selectively removed, such as through laser ablation or plasma etching. However, the tie layer 120 can be (selectively) applied in any other way, can be of any other thickness, and can also or alternatively be applied to the interior surface of the tactile layer 130.

In other variations of the first dynamic tactile interface 100, a different material, such as urethane, polyurethane, epoxy, silicone, titanium, gold, primer, adhesives, an adhesive monomer layer, or any other suitable material or combination of materials enabling adhesion between the tactile layer 130 and the substrate no, is used in place of silicon oxide to create the film that joins the tactile layer 130 and the substrate no. In yet other variations of the first dynamic tactile interface 100, the silicone oxide layer is excluded entirely and the substrate 110 is bonded or coupled directly to the tactile layer 130.

The tactile layer 130 of the first dynamic tactile interface 100 defines the peripheral region 132 that is bonded to the tie layer 120 and the deformable region 131 that is adjacent the deformable region 131, adjacent the fluid conduit 114, and disconnected from the tie layer 120. The tactile layer 130 also defines the tactile surface 133 opposite the substrate no. The tactile layer 130 can be of a flexible and/or elastic material that is translucent or transparent, such as polyethylene terephthalate (PET), polycarbonate (PC), silicone, or urethane. However, the tactile layer 130 can be any other substantially transparent material.

As shown in FIG. 1A, the tactile layer 130 can include two sublayers, including an outer sublayer and a buffer backing. The outer sublayer can be substantially rigid and durable to resist scratching and can be bonded to the tie layer 120 via the buffer backing. In one example, the outer sublayer is a more rigid material such as polycarbonate or PET (polyethylene terephthalate), and the buffer backing is substantially more extensible, has a lower modulus, and is more elastic, such as silicone. The tactile layer 130 is operable between the expanded and retracted settings, wherein the outer sublayer deforms between settings and the buffer backing substantially absorbs deformation of the tactile layer 130 proximal a deformation boundary around the deformable region 131. Because the outer sublayer can be a substantially transparent polymer, repeated transitions between the expanded and retracted settings can result in crazing or drawing near the deformation boundary, which can reduce optical clarity near the circumference of the deformable region 131 and/or result in plastic deformation of the tactile layer 130 over time. However, the buffer backing can soften or cushion the transition region of the outer sublayer at the border between the deformable and deformable regions. Generally, the buffer backing can stretch in a direction of deformation (e.g., outward) when the tactile layer 130 is expanded to absorb sharp deformation of the outer sublayer between settings. Therefore, the tactile layer 130 that includes an outer sublayer and a buffer backing can exhibit improved scratch-resistance and a glass-like tactile feel at the tactile surface 133 while maintaining optical clarity at deformation boundaries throughout repeated transitions between expanded and retracted settings. The tactile layer 130 that includes multiple (e.g., two) sublayers can also enable strain due to application of force on the tactile layer 130 to preferentially manifest in the softer (i.e. buffer) sublayer and rather than the harder (outer) sublayer, which can permit less extensible, more durable layers to be used as the outer sublayer of the tactile layer 130.

The tactile layer 130 can be of uniform composition across the deformable and peripheral regions. However, the tactile layer 130 can be selectively flexible or elastic. For example, materials arranged at the deformable region 131 can be substantially flexible or elastic and materials arranged at the peripheral region 132 can be substantially less flexible or less elastic. The tactile layer 130 can also be of uniform thickness, such as less than one millimeter (1 mm) across the deformable and peripheral regions. However, the tactile layer 130 can alternatively be of non-uniform thickness. For example, the tactile layer 130 can be thinner at the deformable region 131 than at the peripheral region 132 to increase flexibility at the deformable region 131. In another example, the tactile layer 130 can be thicker at the deformable region 131 than at the peripheral region 132 such that the tactile surface 133 of deformable region defines a lip or edge on the tactile surface 133. In a further example, the tactile layer 130 can be thicker at the deformable region 131 than at the peripheral region 132 such that the deformable region 131 extends into a recess on the interior surface of the substrate no adjacent the fluid conduit 114, wherein the recess includes the support surface 115 that supports the extension of the deformable region 131 to prevent inward deformation of the deformable region 131 in the retracted setting due to an input on the tactile surface 133. In still another example, the interior surface of the tactile layer 130 can include a valley that at least partially defines the fluid channel 113 when the tactile layer 130 is bonded to the substrate 110. However, the tactile layer 130 can be of any other form or geometry.

The tactile surface 133 of the tactile layer 130 can be substantially smooth to the touch. Alternatively, the tactile surface 133 can include a matte, textured, or patterned surface. For example, a matte surface may reduce glare from reflected light and yield beneficial light transmission and light scattering properties at the tactile surface 133. A matte finish can also be applied on top of the tactile surface 133, such as before the tactile layer 130 is bonded to the substrate 110 or before sublayers of the tactile layer 130 are joined. A matte finish or texture can also be applied to the tactile surface 133 during a bonding process to join the tactile layer 130 to the substrate 110 or to join sublayers of the tactile layer 130. For example, a heated matte-patterned roller can be passed over the tactile surface 133 or a smooth heated roller can press a matte-patterned sheet over the tactile layer 130, either of which can impress a matte pattern into the tactile surface 133. However, other patterns or surface features can be additionally or alternatively applied to the tactile surface 133, another sublayer or surface of the tactile layer 130, other surface or sublayer of the substrate 110, etc. Furthermore, a pattern or finish can be applied to any one or more layers, sublayers, or surfaces of the first dynamic tactile interface 100 in any other suitable way.

The tactile layer 130 can be bonded to the substrate 110 via the tie layer 120, which can retain the tactile layer 130 to the substrate 110 via a mechanical bond by enabling crystalline grain growth across a boundary between the tie layer 120 and the adjacent interior surface of the tactile layer 130. Alternatively, the tie layer 120 can retain the tactile layer 130 against the substrate 110 via covalent bonds, wherein the tie layer 120 bonds covalently with the tactile layer 130 while being retained by the underlying substrate. However, the tie layer 120 can retain the tactile layer 130 to the substrate 110 via entanglement of polymer strands between layers, hydrogen bonds, Van der Walls bonds, or any other suitable type of chemical or mechanical bond or attachment.

Figure 6B:
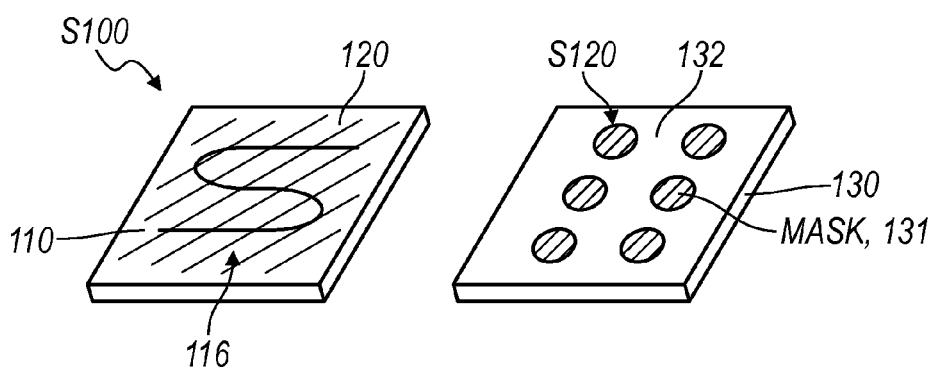
Figure 6C:
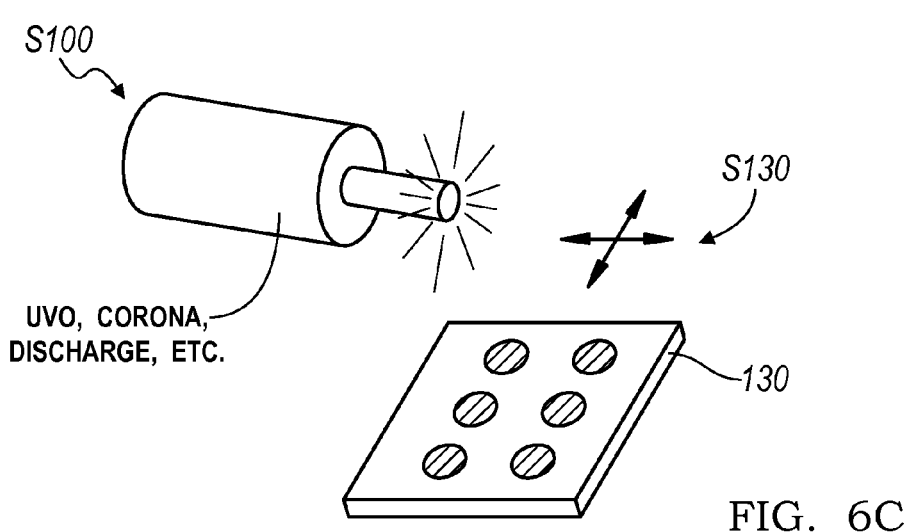
Figure 6D:
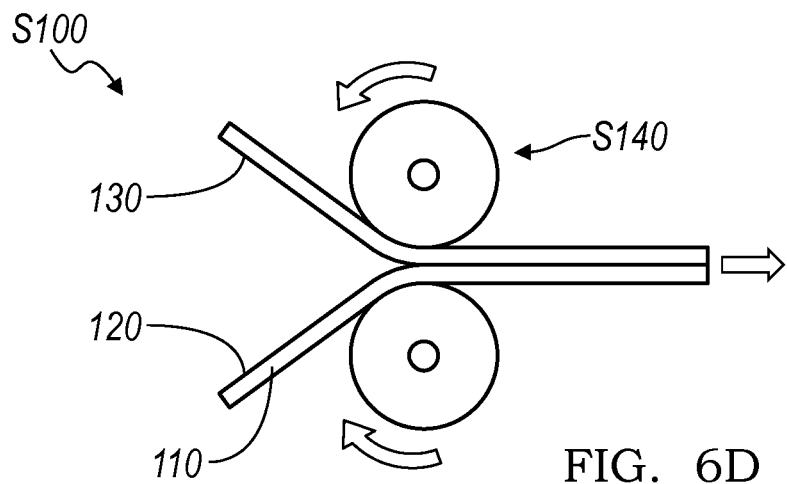
Figure 6E:
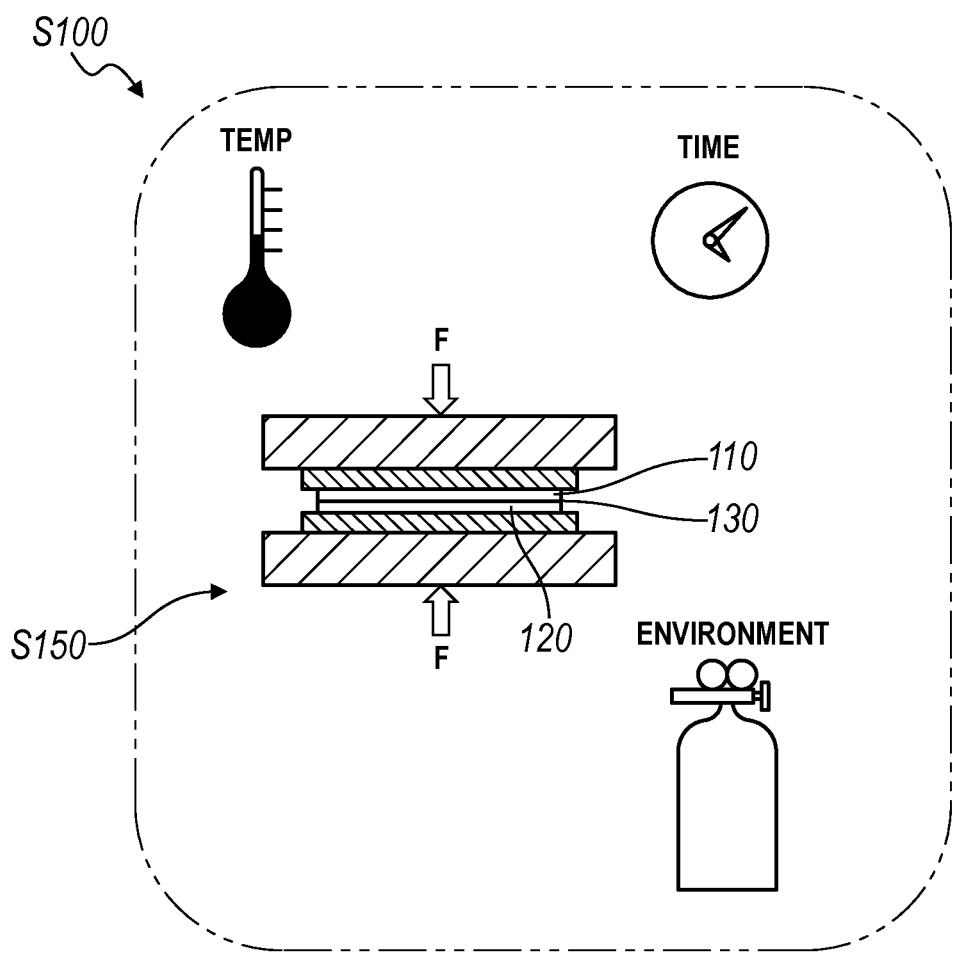

In one variation of the first dynamic tactile interface 100, the tie layer 120, previously deposited on the attachment surface 116 (shown in FIG. 6A), is pre-treated with a corona treatment (e.g., air plasma treatment). The corona treatment can improve the surface energy and create reactive species of the tie layer 120 in preparation for bonding with the tactile layer 130. The interior surface of the tactile layer 130 can be masked at the deformable region 131, as shown in FIG. 6B, and then pre-treated with a corona treatment and/or cleaned in ultraviolet ozone, as shown in FIG. 6C. At least one of these processes can prepare the interior surface of the tactile layer 130 for bonding at exposed areas only, which can include the peripheral region 132 and exclude the deformable region 131 such that the deformable region 131 remains disconnected from the substrate 110 via the tie layer 120. The tactile layer 130 and the tie layer 120 can then be stacked, aligned, and laminated. The stack can be laminated by passing the stack through a set of rollers, as shown in FIG. 6D and then cured according to a time, temperature, pressure, and environment schedule, as shown in FIG. 6E, such as at 30 psi for two hours at room temperature in a dry nitrogen environment. The stack can then be trimmed to size.

The curing schedule can define application of temperature and pressure the tactile layer 130 and silicone oxide film over time to yield a substantially adequate bond therebetween. The curing schedule can also improve the bond between the substrate 110 and the tie layer 120. The bond between the tie layer 120 and the substrate 110 and/or the tactile layer 130 can be a macroscopic mechanical bond, such as a diffusion bond defined by cross-boundary grain growth such that the tie layer 120 and at least one of the substrate no and the tactile layer 130 appear as a singular structure substantially proximal a boundary. Additionally or alternatively, the bond between the tie layer 120 and the substrate 110 and/or the tactile layer 130 can be a chemical bond. For example, atoms or molecules on a first side of a boundary combine with atoms or molecules on a second side of the boundary to form a third material proximal the boundary. The third material can exhibit adequate adhesion to the parent materials on each side of the boundary, as well as adequate cohesion between molecules within the third material to retain the peripheral region 132 of the tactile layer 130 to the attachment surface 116 of the substrate no. Furthermore, the curing schedule can include curing in an inert environment, such as nitrogen or argon, to minimize contamination of the bond, which can negatively affect the strength of the bond and/or the optical clarity of the substrate no and tactile layer stack. However, the bond between the tie layer 120 and at least one of the substrate no and the tactile layer 130 can be any other type of bond or combination of types of bonds and can be achieved in any other way.

In the foregoing variation of the first dynamic tactile interface 100, the tie layer 120 can also or alternatively be selectively pre-treated to ensure joining at the peripheral region 132 and not at the deformable region 131, such by applying a mask or shield over select portions of the tie layer 120 prior to treatment. The tie layer 120 can also be treated via other techniques, such as ultraviolet ozone treatment, low-pressure plasma, corona discharge, etching, flame treatment, or solvent wipe. Any of these treatments can additionally or alternatively be applied to the interior surface of the tactile layer 130 prior to lamination to ensure select adherence between the tactile layer 130 and the substrate no via the tie layer 120. Similarly, an anti-stick or bond-inhibitor coating can be applied to areas of the back surface of the tactile layer 130 and/or to the tie layer 120 in areas corresponding to the deformable region 131. Furthermore, the tactile layer 130 can be selectively bonded to the tie layer 120 via "masked" or selective irradiation or heating during a bonding or laminating process.

The tactile layer 130 and substrate can include alignment features, such as print markers (e.g., "+" or "¬" marks) at two or more corners of each of the tactile layer 130 and the substrate 110 to aid manual alignment or automated alignment via machine vision. Alternatively, the substrate no and the tactile layer 130 can be supplied as sheets in separate rolls that are merged as they enter a set of laminator rollers. The set of rollers can be a pair or rollers into which the substrate no and tactile layer stack is fed, or the substrate 110 and tactile layer stack can be laminated between a static flat plate and a single roller or laminated between two faces in a press. One or more rollers or press faces can be heated, such as with an induction heating coil or with a quartz heating rod, to boost bond temperature, which can increase bond strength, improve optical clarity, and/or reduce cure time for the stack.

Figure 5:
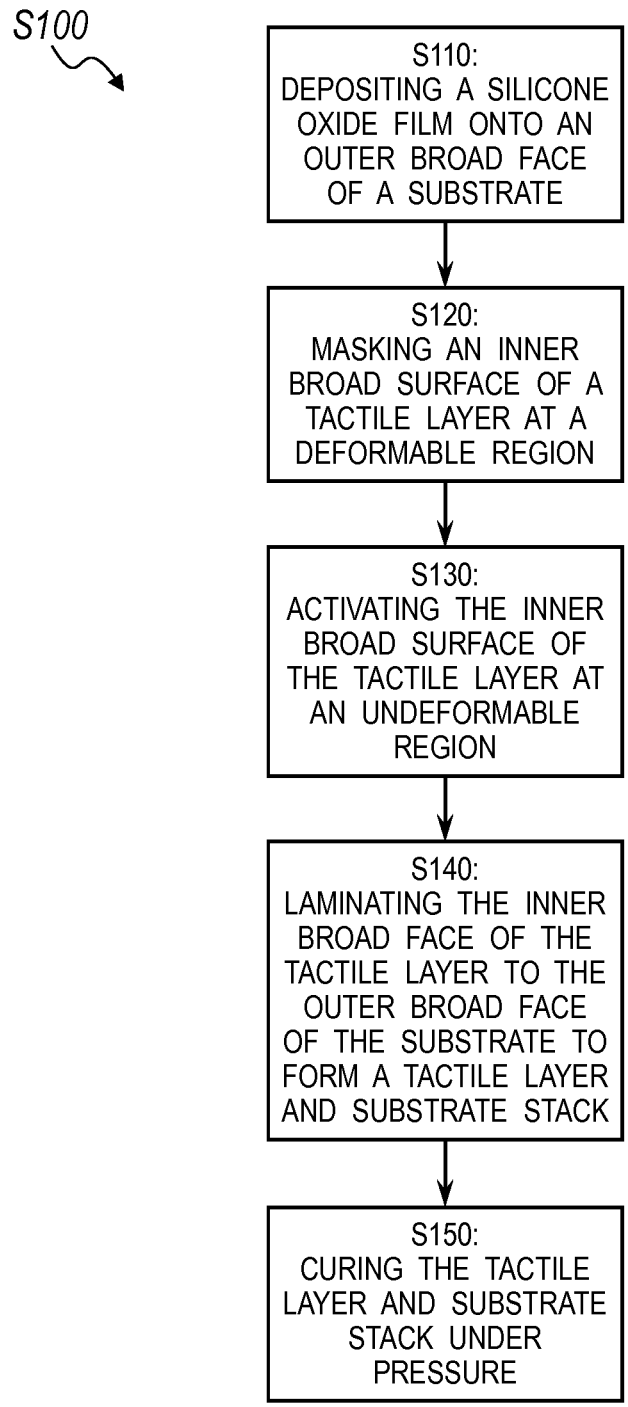
FIG. 5 is a flowchart representation of a second method of the invention.

Therefore, as shown in FIG. 5, a second method 5200 for bonding a tactile layer 130 to a substrate no can include: depositing a tie layer 120 onto an outer broad face of the substrate no as shown in FIG. 6A as Block S210; masking an inner broad face of the tactile layer 130 at a deformable region 131 as shown in FIG. 6B as Block S230; activating the inner broad face of the tactile layer 130 at an peripheral region 132 as shown in FIG. 6C as Block S212; laminating the inner broad face of the tactile layer 130 to the outer broad face of the substrate no to form a tactile layer 130 and substrate 110 stack as shown in FIG. 6D as Block S250; and curing the tactile layer 130 and substrate 110 stack under pressure as shown in FIG. 6E as Block S240.

The second method S200 can be implemented to bond the tactile layer 130 and the substrate 110 of the user interface 100, as described above. The second method S200 can further include cleaning or activating the tie layer 120, such as with a corona treatment, ultraviolet ozone treatment, low-pressure plasma, corona discharge, etching, flame treatment, or solvent wipe, as described above. The second method S200 can also include masking a portion of the outer broad face of the substrate no that is aligned with the deformable region 131 of the tactile layer 130 in the tactile layer 130 and substrate 110 stack. The second method S200 can therefore further include removing the mask from the inner broad face of the tactile layer 130 and/or from the outer broad face of the substrate 110. However, the second method S200 can include any other procedure implemented in any other way to bond the tactile layer 130 to the substrate 110.

However, the substrate 110 and tactile layer stack can be assembled and/or bonded according to any other technique or process.

The displacement device 140 of the first dynamic tactile interface 100 is coupled to the fluid channel 113 and is configured to displace fluid through the fluid channel 113 to transition the deformable region 131 from the retracted setting to the expanded setting. Generally, the displacement device 140 can actively displace fluid through the fluid channel 113 and the fluid conduit 114 to outwardly expand the deformable region 131 to transition the deformable region 131 from the retracted setting to the expanded setting. Furthermore, the displacement device 140 can actively remove fluid from the fluid channel 113 and the fluid conduit 114 to inwardly retract the deformable region 131 to transition the deformable region 131 from the expanded setting to the retracted setting. The displacement device 140 can also transition the deformable region 131 to one or more intermediate positions or height settings between the expanded and retracted settings. In the retracted setting, the tactile surface 133 at the deformable region 131 can be in-plane or aligned with the tactile surface 133 at the peripheral region 132. However, in the retracted setting, the deformable region 131 can be positioned at any other height relative the peripheral region 132. In the expanded setting, the tactile surface 133 at the deformable region 131 can be elevated above the tactile surface 133 at the peripheral region 132 such that the expanded setting is tactilely distinguishable from the retracted setting at the tactile surface 133. However, the deformable region 131 can be positioned at any other height relative the peripheral region 132 in the expanded setting.

The displacement device 140 can be an electrically-driven positive-displacement pump, such as a rotary, reciprocating, linear, or peristaltic pump powered by an electric motor. Alternatively, the displacement device 140 can be an electroosmotic pump, a magnetorheological pump, a microfluidic pump, a manually-powered pump, such as powered though a manual input provided by the user, or any other suitable device configured to displace fluid through the fluid channel 113 and the fluid conduit 114 to transition the deformable regions between settings, such as described in U.S. Provisional Patent Application No. 61/727,083, file don 15 Nov. 2012, which is incorporated in its entirety by this reference.

Figure 2:
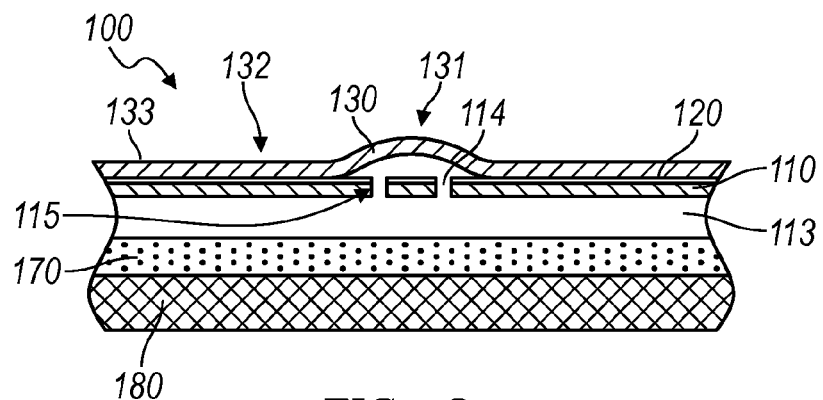
FIG. 2 is a schematic representation of one variation of the first dynamic tactile interface.

As described above and shown in FIG. 2, one variation of the first dynamic tactile interface 100 further includes a touch sensor 170 configured to detect an input at the tactile surface 133. The touch sensor 170 can be a capacitive touch sensor, a resistive touch sensor, an optical touch sensor, a fluid pressure sensor, an acoustic touch sensor, or any other suitable type of sensor. The touch sensor 170 can include a plurality of sensors configured to detect an input at particular regions across the tactile surface 133, including at the deformable region 131. However, the touch sensor 170 can be of any other type, include any other feature or component, and can be patterned across the first dynamic tactile interface 100 in any other way. The touch sensor 170 can be arranged between a display 180 and the substrate 110, as shown in FIG. 2. Alternatively, the display 180 can be a touch display incorporating the touch sensor 170. A portion of the touch sensor 170 can also be coupled to the fluid channel 113, coupled to the fluid conduit 114, or arranged within the substrate 110, such as above or below the fluid channel 113. A portion of the touch sensor 170 can also be arranged within the tactile layer 130. However, all or a portion of the touch sensor 170 can be arranged in any other way within the first dynamic tactile interface 100.

Figure 3:
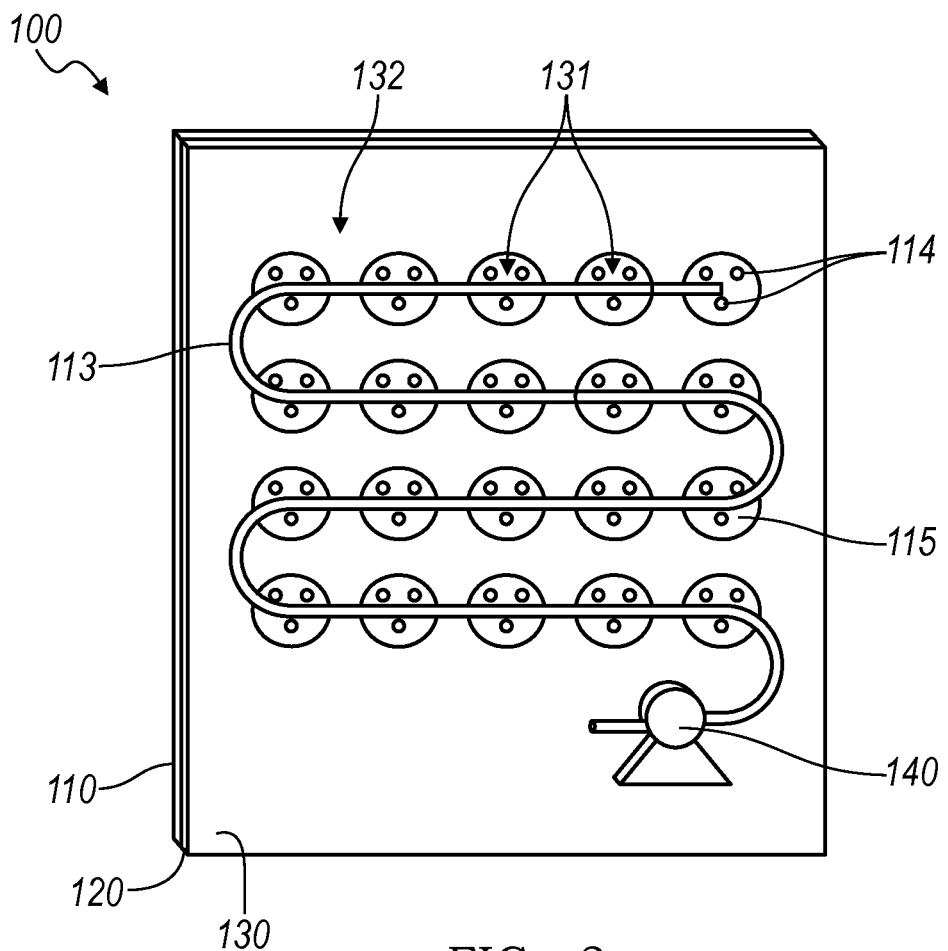
FIG. 3 is a schematic representation of one variation of the first dynamic tactile interface.

One variation of the first dynamic tactile interface 100 incorporates a plurality of deformable regions, each paired with a fluid conduit fluidly coupled to at least one fluid channel, as shown in FIG. 3. In this variation, the first dynamic tactile interface 100 can also include one or more displacement devices coupled to the one or more fluid channels, wherein the displacement devices displace fluid through the one or more fluid channels to transition one or more deformable regions between retracted and expanded settings at any given time. In this variation, the deformable regions can define input keys of a QWERTY keyboard when in the expanded setting. Furthermore, the display 180 can output an image aligned with each deformable region, wherein each image is indicative of an input key associated with each deformable region (e.g., SHIFT, 'a,' 'g,' or '8'). In this variation, when the deformable regions are in the expanded setting, a processor coupled to the touch sensor 170 can identify an input on the tactile surface 133 that substantially inwardly deforms a deformable region as an input request for the input key, whereas the processor can identify an input on the tactile surface 133 that does not substantially inwardly deform the deformable region 131 as a second type of input that is not a request for the input key. However, the first dynamic tactile interface 100 can include any other components arranged in any other way to achieve any other function.

In another variation of the first dynamic tactile interface 100, the substrate no is physically coextensive with at least one of the display 180 and the touch sensor 170. In this variation, the fluid channel 113 is formed in the interior surface of the tactile layer 130 or is otherwise substantially defined on or within the tactile layer 130. In this variation, the tactile layer 130 is bonded to the substrate no at the peripheral region 132, wherein the substrate no rigidly retains the peripheral region 132 during setting transitions of the deformable region 131. However, the first dynamic tactile interface 100 can be of any other form and include any other suitable component, film, or layer.

One variation of the first dynamic tactile interface 100 is incorporated into an electronic device. The electronic device can be any of an automotive console, a desktop computer, a laptop computer, a tablet computer, a television, a radio, a desk phone, a mobile phone, a personal data assistant (PDA), a personal navigation device, a personal media player, a camera, a watch, a gaming controller, a light switch or lighting control box, cooking equipment, or any other suitable electronic device.

2. Second Dynamic Tactile Interface 200

As shown in FIGS. 11A and 11B, a second dynamic tactile interface 200 includes: a substrate 210 including a first transparent material and defining an attachment surface 216, an open channel 213A opposite the attachment surface 216, and a fluid conduit 214 intersecting the open channel 213A and passing through the attachment surface 216; a tactile layer 230 including a second transparent material and defining a tactile surface 233, a peripheral region 232 bonded to the attachment surface 216 opposite the tactile surface 233, and a deformable region 231 adjacent fluid conduit 214 and disconnected from the attachment surface 216; a closing panel 212 bonded to the substrate 210 opposite the attachment surface 216 and enclosing the open channel 213A to define a fluid channel 213B; a working fluid 250; and a displacement device 240 configured to displace the working fluid 250 into the fluid channel 213B and through fluid conduit 214 to transition the deformable region 231 from a retracted setting to an expanded setting, the deformable region 231 flush with the peripheral region 232 in the retracted setting (shown in FIG. 11A) and offset from the peripheral region 232 in the expanded setting (shown in FIG. 11B).

Figure 12:
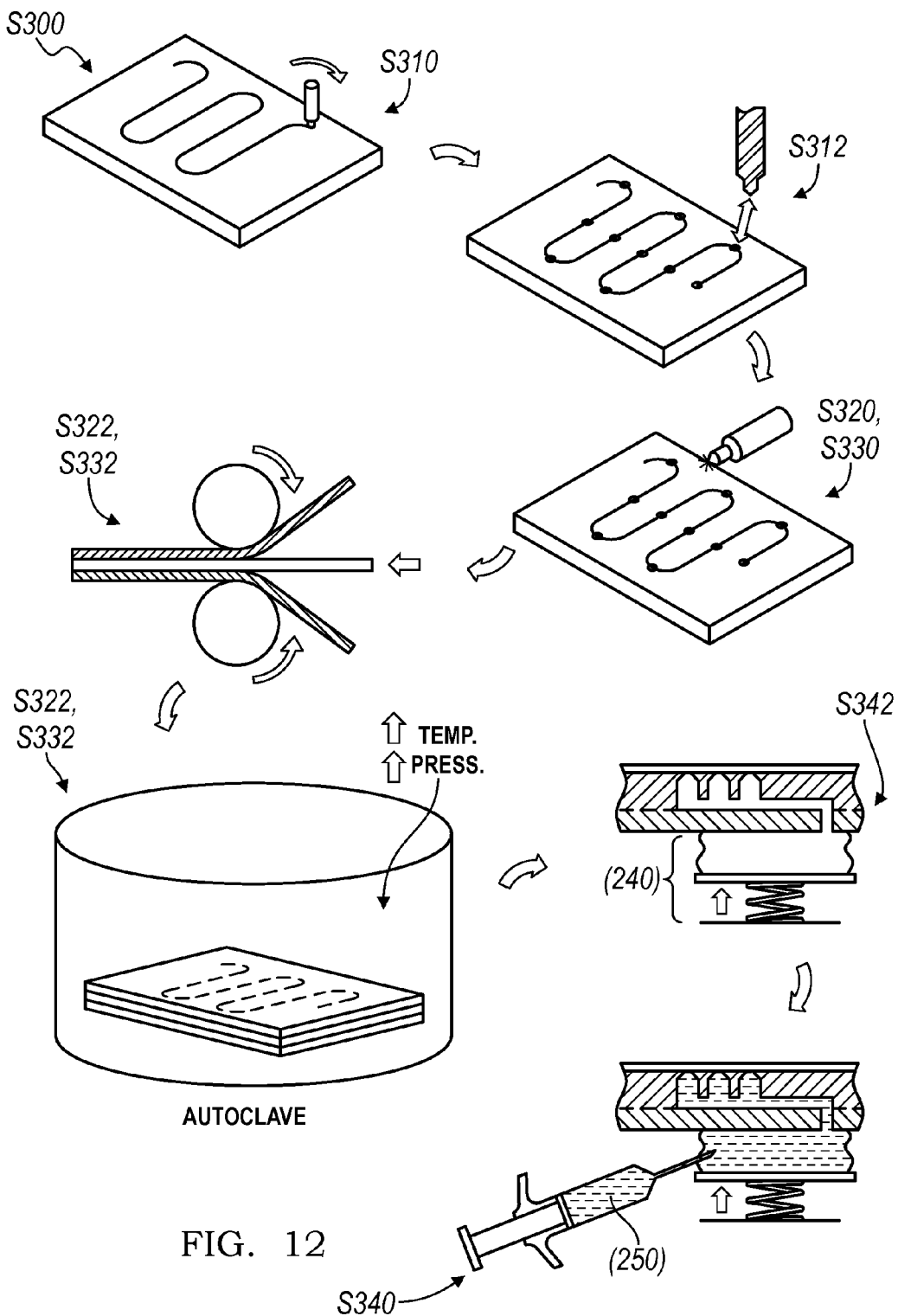
FIG. 12 is a flowchart representation of a third method of the invention.

As shown in FIG. 12, a method for manufacturing the second dynamic tactile interface 200 includes: creating an open channel in an interior surface of a substrate including a first transparent material and defining an attachment surface 216 opposite the interior surface in Block S310; creating a fluid conduit intersecting the open channel 213A and passing through the attachment surface 216 of the substrate 210 in Block S312; activating the attachment surface 216 in Block S320; selectively bonding a peripheral region of a tactile layer to the attachment surface 216 in Block S322, the tactile layer 230 including a second transparent material and defining a deformable region disconnected from the attachment surface 216 proximal fluid conduit 214; activating the interior surface in Block S330; bonding a closing panel to the interior surface to enclose a portion of the open channel 213A to define a fluid channel in Block S332; coupling a displacement device to the fluid channel 213B in Block S342; and filling the fluid channel 213B with a working fluid in Block S340.

Like the first dynamic tactile interface, the second dynamic tactile interface 200 functions to expand and retract one or more deformable regions to intermittently and selectively provide tactile guidance over a touchsensor and/or display of a computing device. For example, second dynamic tactile interface 200 can be implemented in a smartphone, tablet, laptop, PDA, automotive or in-dash console, a desktop computer, a television, a radio, a desk phone, a mobile phone, a personal navigation device, a personal media player, a camera, a watch, a gaming controller, a light switch or lighting control box, cooking equipment, or any other suitable computing or electronic device. The second dynamic tactile interface 200 can also be incorporated in an aftermarket device for a computing device, such as described in U.S. patent application Ser. No. 13/465,772, filed on 7 May 2012, which is incorporated in its entirety by this reference The substrate 210 of the second dynamic tactile interface 200 includes a first transparent material and defines an attachment surface 216, an open channel opposite the attachment surface 216, and a fluid conduit intersecting the open channel 213A and passing through the attachment surface 216. Generally, the substrate 210 functions like the substrate 110 of the first dynamic tactile interface 100 to define an attachment surface 216 that retains a peripheral region of a tactile layer, one or more fluid ports, one or more support members (or support areas) adjacent the fluid ports and deformable regions of the tactile layer 230, and one or more fluid channels that feed fluid into and out of the fluid channels to transition the deformable regions between expanded and retracted settings. The substrate 210 can be substantially transparent and substantially rigid relative to the tactile layer 230 such that changes in fluid pressure within the fluid channel 213B are predominantly absorbed by the deformable region 231 of the tactile layer 230—rather than the substrate 210—thus yielding controlled expansion and retraction of the deformable region 231 of the tactile layer 230.

Figure 13A:
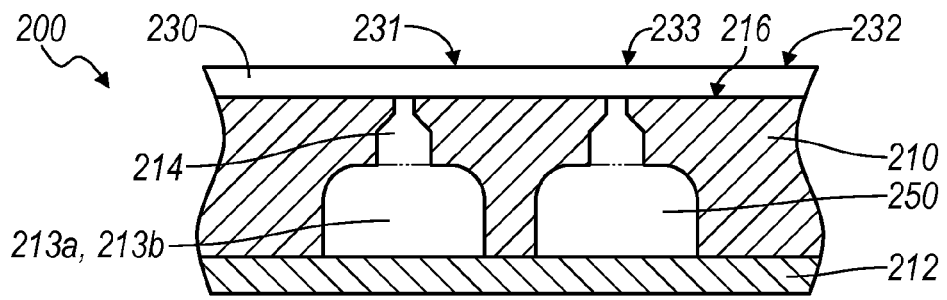
FIGS. 13A and 13B are schematic representations of one variation of the second dynamic tactile interface.
Figure 13B:
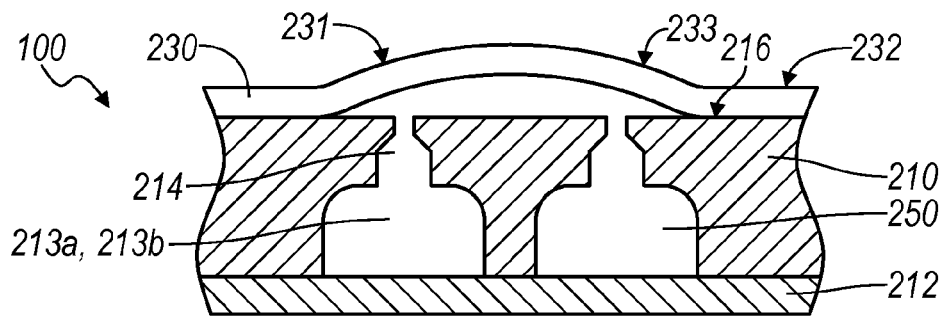

In one implementation, the substrate 210 is a thermoset resin cast in sheet form, such as polycarbonate or a polycarbonate-hybrid polymer. In this implementation, the substrate 210 can begin as a cast polymer sheet of uniform thickness that is post-machined to create the fluid channel 213B and fluid conduit 214. For example, a ball endmill (or endmill of other suitable contour) can be plunged part-way (e.g., through 70% of the thickness of the substrate 210) into the interior surface of the substrate 210 opposite the attachment surface 216. In this example, the ball endmill can then be displaced laterally across the interior surface to cut the open channel 213A of substantially constant depth, as in Block S310 of the method. A tapered endmill ("taper mill") can then be plunged fully through the substrate 210 normal to the interior surface to create one or more frustoconical bores (i.e., fluid conduits) intersecting the open channel 213A, as in Block S312 of the method. The substrate 210 can then be acid-dipped, flame polished, or otherwise processed to reduce or eliminate machining artifacts in the bore(s) and open channel(s). Therefore, in this example, fluid conduit 214 can include a frustoconical section tapering toward the attachment surface 216, and, once the closing panel 212 is bonded to the interior surface of the substrate 210 to enclose the open channel 213A and thus define the fluid channel 213B, the fluid channel 213B can define a curvilinear cross-section, as shown in FIGS. 13A and 13B.

Alternatively, the substrate 210 can be acrylic, glass, urethane, polyurethane, or of any other substantially transparent, translucent, and/or relatively rigid material. The open channel 213A and fluid conduit 214 can also be machined (e.g., drilled), stamped, molded, extruded, laser cut, imprinted, or formed in any other way into the substrate 210, such as described above.

The substrate 210 can further define a second open channel opposite the attachment surface 216 and parallel to the fluid channel 213B and a second fluid conduit intersecting the second open channel and passing through the attachment surface 216 adjacent fluid conduit 214 and the deformable region. In this implementation, the substrate 210 can cooperate with the closing panel 212 to enclose the second open channel and thus define a second fluid channel, and the second fluid can also be coupled to the displacement device 240 such that the displacement device 240 can displace the working fluid 250 through both the fluid channel 213B and the second fluid channel (and fluid conduit 214 and the second fluid conduit) to transition the deformable region 231 from the retracted setting to the expanded setting. In this implementation, fluid can similarly drain back into fluid conduit 214 and the second fluid conduit and then into the fluid channel 213B and the second fluid channel, respectively, as the deformable region 231 transitions from the expanded setting back into the retracted setting.

The tactile layer 230 of the second dynamic tactile interface 200 includes a second transparent material and defines a tactile surface, a peripheral region bonded to the attachment surface 216 opposite the tactile surface 233, and a deformable region adjacent fluid conduit 214 and disconnected from the attachment surface 216. Generally, the tactile layer 230 functions as an exterior surface of the second dynamic tactile interface 200 (and the computing device) within one or more regions that can be selectively and intermittently deformed to define tactilely-distinguishable formations configured to tactilely guide user input into the computing device. As described above, the tactile layer 230 can be substantially uniform in thickness and composition throughout its thickness and substantially transparent. The tactile layer 230 can also be uniformly elastic and/or flexible relative to the substrate 210 throughout its volume. Alternatively, the tactile layer 230 can be of varying thickness, optical property, or mechanical property throughout its thickness or volume. For example, the tactile layer 230 can feature a well or recess around a perimeter of the deformable region 231 (inside the peripheral region). The tactile layer 230 can be selectively doped across the deformable region 231 to increase elasticity of the deformable region and/or selectively cross-linked to reduce elasticity across the peripheral region.

In one implementation, the substrate 210 is formed of a thermoset polymer material (e.g., a polycarbonate-hybrid polymer) of a first elasticity, and the tactile layer 230 is formed of a urethane material of a second elasticity greater than the first elasticity (of the substrate 210 material). In this implementation, the tactile layer 230 and the substrate 210 can be assembled by first cleaning the substrate 210 (e.g., in ultraviolet ozone) and activating the attachment surface 216 of the substrate 210, as in Block S320 of the third method. For example, the attachment surface 216 can be treated with nitrogen surface activation to create nitrogen groups (e.g., nitrates, nitrites) along the attachment surface 216 and at a skin depth (e.g., ~5 μm) within the substrate 210. The attachment surface 216 can then be masked with an area around the fluid port corresponding to the deformable region 231 exposed and a release compound applied across the mask. Alternatively, the release compound can be printed onto the area around the fluid port corresponding to the deformable region, such as with a two-axis printing head, screen printing, stereo lithography, or other printing technique or apparatus. The release compound can be a mold release wax, water, oil, alcohol, or other suitable material. Yet alternatively, the attachment surface 216 can be selectively activated, including a portion of the attachment surface 216 corresponding to the peripheral region 232 and excluding a portion of the attachment surface 216 corresponding to the deformable region.

In the foregoing implementation, once the attachment surface 216 is activated and/or masked proximal fluid conduit 214 and the tactile layer 230 is cleaned (e.g., in ultraviolet ozone, as described above), the peripheral region 232 of the tactile layer 230 can be selectively bonded to the attachment surface 216 of the substrate 210, as in Block S322 of the third method. For example, the substrate 210 and the tactile layer 230 can be laminated together between a set of rollers, as described above, and then placed in an autoclave for a time, temperature, and pressure specified in curing profile. In this example, the substrate 210 and tactile layer stack can be cured in an elevated temperature (e.g., 400° F.) and/or elevated pressure (e.g., 60 psi) environment within the autoclave for a predefined period of time (e.g., one hour), which can cause a bond to grow across the boundary between the substrate 210 and the tactile layer 230 and can reduce the volume of any gas (e.g., air) trapped between the substrate 210 and the tactile layer 230. The curing process can thus yield a stable bond between the substrate 210 and the tactile layer 230 and can reduce optical aberrations between the substrate 210 and the tactile layer 230 caused by trapped gases therebetween. In particular, as the tactile layer 230 and substrate stack cures, polymer chains within the tactile layer 230 can bond to the nitrogen groups along portions of the attachment surface 216 corresponding to the peripheral region, and the release compound (e.g., working fluid) applied to the attachment surface 216 around fluid conduit 214 can locally retard bonding between the tactile layer 230 and the substrate 210 to yield the deformable region 231 adjacent fluid conduit 214 and disconnected from the attachment surface 216.

Figure 14A:
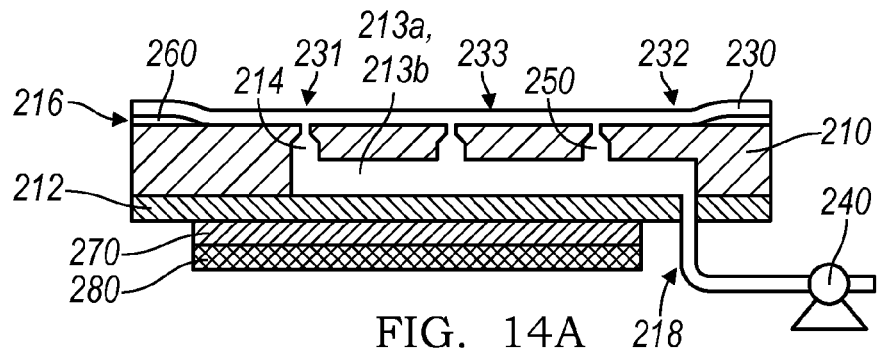
FIGS. 14A and 14B are schematic representations of one variation of the second dynamic tactile interface.
Figure 14B:
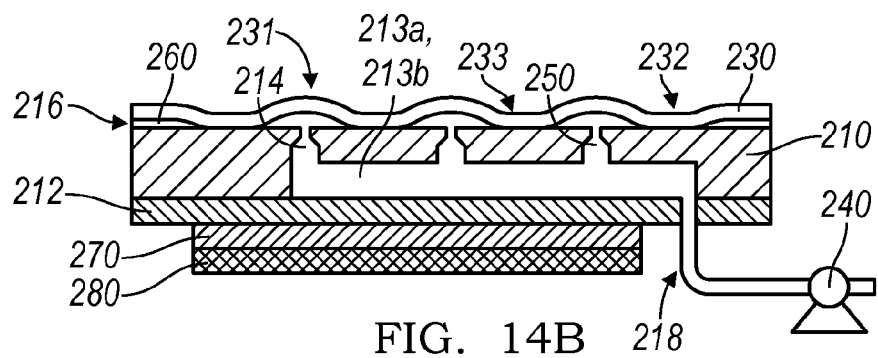

As shown in FIGS. 14A and 14B, one variation of the second dynamic tactile interface 200 includes an ink bezel 260 arranged about a perimeter of the attachment surface 216 between the substrate 210 and the tactile layer 230. In this variation, the ink bezel 260 can be substantially opaque and thus define an opaque border around the second dynamic tactile interface 200. For example, the ink bezel 260 can mask (i.e., hide from view) traces and a ribbon connector for a touch sensor coupled to the closing panel 212 opposite the substrate 210. The ink bezel 260 can also mask a via 218 in the closing panel 212 (shown in FIG. 14A) that feeds fluid from the displacement device 240 into the fluid channel 213B, as described below. The ink bezel 260 can be applied along the entire perimeter of the attachment surface 216 or along one or a subset of edges of the attachment surface 216. The ink bezel 260 can also be of similar or dissimilar width from each edge of the attachment surface 216. For example, for the second dynamic tactile interface 200 implemented within a smartphone, the ink bezel 260 can be 0.20" wide along the vertical edges of the attachment surface 216 and 0.80" wide along the horizontal edges of the attachment surface 216.

Figure 15:
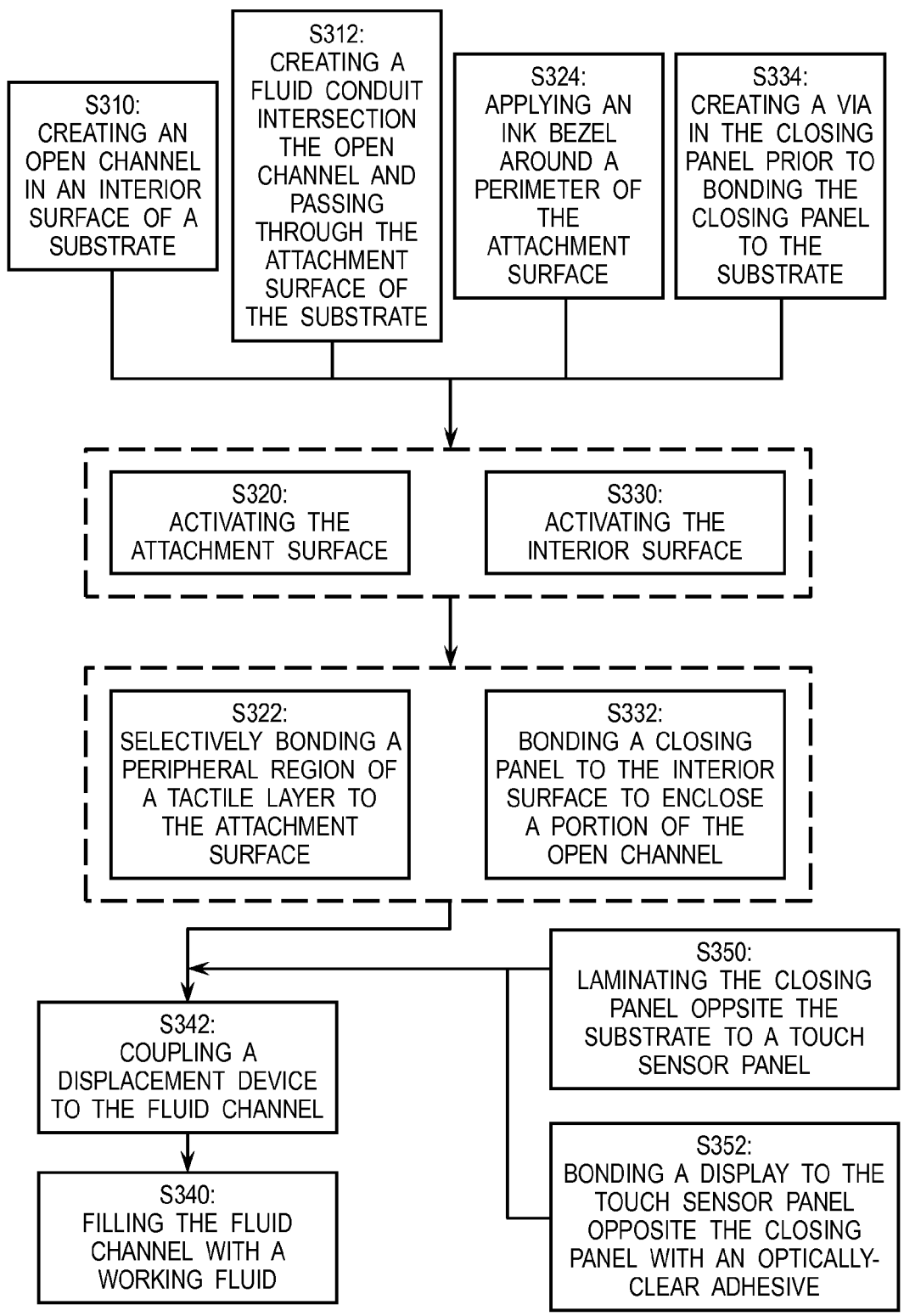
FIG. 15 is a flowchart representation of one variation of the third method.

One variation of the third method can therefore include applying an ink bezel around a perimeter of the attachment surface 216 in Block S324, as shown in FIG. 15. In the foregoing implementation, the ink bezel 260 can be applied to the attachment surface 216 prior to assembly of the tactile layer 230 over the substrate 210 such that the substrate 210 and the tactile layer 230 cooperate to substantially enclose the ink bezel 260. For example, once the substrate 210 is cleaned and the attachment surface 216 activated, a black ink in an alcohol or epoxy suspension can be printed or rolled onto the attachment surface 216 in a substantially uniform thickness to yield suitably minimal local light transmission. The tactile layer 230 can then be laminated over the ink and the attachment surface 216 and cured, as described above. In this implementation, which the tactile layer 230, substrate, and ink bezel stack cures, the ink bezel 260 can flow or deform at its interior edge proximal the junction between the tactile layer 230, substrate, and ink bezel (e.g., due to elevated temperature in the autoclave) to form a smooth transition between the tactile layer 230, substrate, and ink bezel, as shown in FIGS. 14A and 14B.

Alternatively, the ink bezel 260 in the form of an uncured black epoxy sheet or a black urethane sheet can be trimmed to size and applied over the attachment surface 216, applied to the interior surface of the tactile layer 230, or inserted between the substrate 210 and the tactile layer 230 prior to bonding. Yet alternatively, the ink bezel 260 can be applied to or inserted between the interior surface of the substrate 210 and the closing panel 212 with similar techniques or methods.

The closing panel 212 of the second dynamic tactile interface 200 is bonded to the substrate 210 opposite the attachment surface 216 and encloses the open channel 213A to define a fluid channel. The closing panel 212 can be of a material similar to that of the tactile layer 230 such that the closing panel 212 can be bonded to the substrate 210 with a technique or method similar to that described above to bond the tactile layer 230 to the substrate 210. For example, both the closing panel 212 and the tactile layer 230 can be of urethane, but the tactile layer 230 can be a urethane material of a higher elasticity (e.g., lower durometer or Shore hardness) than the urethane material of the closing panel 212 such that the tactile layer 230 is more prone to deformable at the deformable region 231 than the closing panel 212 proximal the open channel 213A when fluid pressure within the fluid channel 213B changes. The closing panel 212 can also be of a uniform thickness similar to that of the tactile layer 230. Alternatively, the closing panel 212 can be substantially thick (i.e., thicker than the tactile layer 230) to resist outward deformation proximal the open channel 213A when fluid pressure within the fluid channel 213B increases. Yet alternatively, the closing panel 212 can be substantially thin (i.e., thinner than the tactile layer 230) to function as an interface layer to close the open channel 213A and to bond the interior surface of the substrate 210 to a more rigid panel, such as to a capacitive touch panel with a PMMA substrate or to a display with a glass substrate that support the closing panel 212 against deformation when the fluid pressure within the fluid channel 213B changes. Furthermore, like the tactile layer 230 and the substrate 210, the closing panel 212 can be substantially transparent to enable light transmission therethrough, such as from a display coupled to the second dynamic tactile interface 200 as described above.

In the implementation described above in which the substrate 210 is formed of a polycarbonate-hybrid material and the tactile layer 230 is formed of a urethane material of an elasticity greater than that of the substrate 210, the closing panel 212 can be formed of a urethane material similar to that of the tactile layer 230 but of an elasticity less than that of the tactile layer 230. In this implementation, the closing panel 212 can be bonded to the substrate 210 with a techniques or methods similar to those described above to bond the tactile layer 230 to the substrate 210. In particular, the interior surface of the substrate 210 can be cleaned and then activated, as in Block S330 of the third method. For example, the interior surface can be cleaned in ultraviolet ozone and then treated with nitrogen surface activation as described above. As in Block S332 of the third method, the closing panel 212 can be similarly cleaned and then laminated to the interior surface of the substrate 210, such as described above, to enclose a portion of the open channel 213A, thereby defining the fluid channel 213B. The substrate 210 and the closing panel 212 can then be cured, such as according to a cure schedule similar to that described above.

In the foregoing implementation, the interior surface and the attachment surface 216 of the substrate 210 can be prepared for bonding with the tactile layer 230 and the closing panel 212 substantially simultaneously. For example, the interior surface can be cleaned, then the substrate 210 flipped and the attachment surface 216 cleaned. The interior surface can subsequently be activated, then the substrate 210 flipped and the attachment surface 216 activated. The substrate 210 can then be placed between both the tactile layer 230 and the closing panel 212 and the stack laminated (e.g., through a set of rollers) prior to placement in an autoclave for curing. Alternatively, the substrate 210 and the tactile layer 230 can be bonded and cured, and then the substrate 210-tactile layer stack bonded to the closing panel 212 and cured, or vice versa. However, the tactile layer 230, substrate, and closing panel (and ink bezel) can be prepped and bonded—and the corresponding Blocks of the third method can be performed—in any other suitable order.

In one implementation, the closing panel 212 includes a via configured to communicate fluid between the displacement device 240 and the fluid channel 213B. In the variation of the second dynamic tactile interface 200 that includes the ink bezel 260 between the substrate 210 and the tactile layer 230, the closing panel 212 can define the via 218 behind the ink bezel 260 such that the via 218 is not optically visible through the tactile layer 230. In this implementation, the via 218 can be created in the closing panel 212 prior to bonding the closing panel 212 to the substrate 210, as in Block S334 of the third method shown in FIG. 15. For example, the via 218 can be stamped, machined, drilled, etched (e.g., bulk micro-machined), laser cut, or otherwise formed in the closing panel 212, and the closing panel 212 can then be acid washed, flame polished, or otherwise processed to reduce or eliminates manufacturing artifacts leftover from creation of the via 218. The closing panel 212 can then be aligned with and bonded to the interior surface of the substrate 210 with the via 218 adjacent the open channel 213A (i.e., the fluid channel 213B) such that working fluid can be communicated through the via 218 and into the fluid channel 213B. Alternatively, the via 218 can be created in the closing panel 212 after the closing panel 212 is bonded to the substrate 210.

The second dynamic tactile interface 200 also includes a working fluid. Generally, the displacement device 240 functions to displace the working fluid 250 into the fluid channel 213B, thereby increasing fluid pressure within the fluid channel 213B and fluid conduit 214 and thus causing the deformable region 231 of the tactile layer 230 to expand outwardly. The displacement device 240 can also release fluid pressure within the fluid channel 213B and/or actively pump fluid out of the fluid channel 213B to enable the deformable region 231 to retract, as described above.

The working fluid 250 can be substantially transparent, such as exhibiting a refractive index, Abbe number, and/or chromatic dispersion properties similar to those of the substrate 210 in order to limit diffraction, refraction, and reflection of light within the second dynamic tactile interface 200 at interfaces between the working fluid 250 and the substrate 210 (e.g., at a surface of the fluid channel 213B or at a surface of fluid conduit 214). For example, the working fluid 250 can be water, an alcohol, or an oil.

Figure 16A:
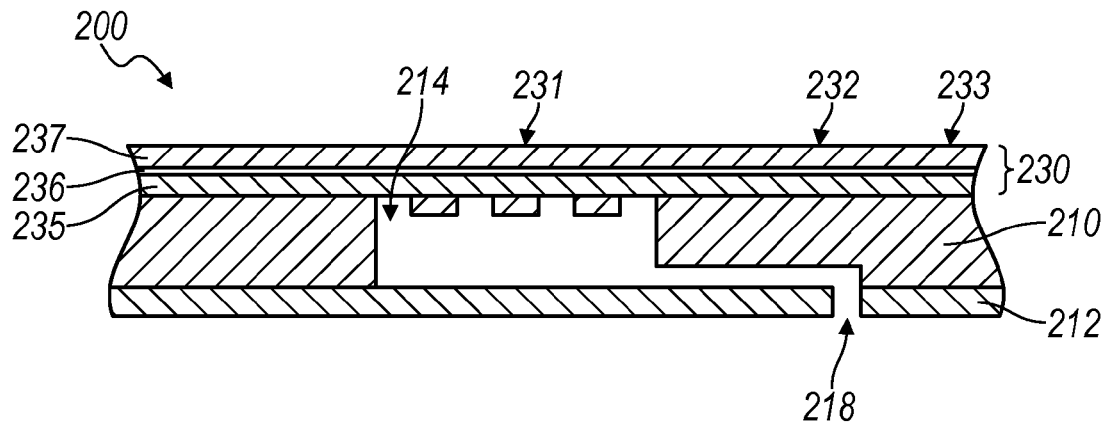
FIGS. 16A and 16B are schematic representations of one variation of the second dynamic tactile interface.
Figure 16B:
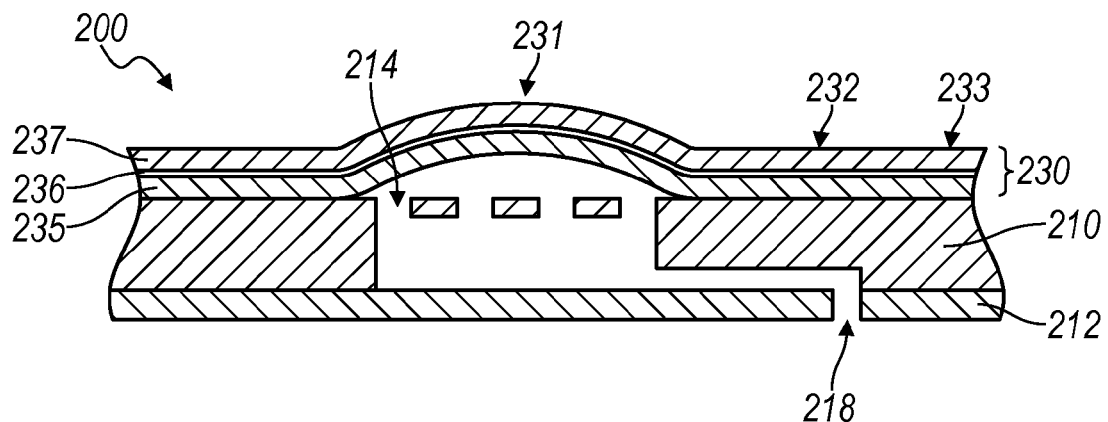

In one implementation, the working fluid 250 is a silicone oil that is substantially incompressible and exhibits low vapor pressure. In this implementation, the base material of the tactile layer 230 can tend to adsorb or "uptake" the working fluid 250, and the tactile layer 230 can thus incorporate a barrier sublayer 236 that is impermeable to the working fluid 250 to limit working fluid uptake into the tactile layer 230. For example, the tactile layer 230 can include a first sublayer 235 (bonded to the substrate 210), a barrier sublayer 236 bonded to the first sublayer 235, and a second sublayer 237 bonded to the barrier sublayer 236 opposite the first sublayer 235, as shown in FIGS. 16A and 16B. In this example, the first and second sublayer 237s can be of the same or similar urethane material, and the barrier sublayer 236 can be nylon, (high-density) polyethylene, or any other suitable plastic that is substantially impermeable to silicone oil. Furthermore, in this example, the barrier sublayer 236 can be substantially thin to enable light transmission through the tactile layer 230 with minimal internal reflection, refraction, or diffraction, and the first sublayer 235 can be substantially thin to minimize a volume of the material over the deformable region 231 that can adsorb the working fluid 250, as shown in FIG. 16B. The second sublayer 237 can thus be substantially thicker than the barrier sublayer 236 and/or the first sublayer 235 to yield suitable strength, elasticity, abrasion resistance, etc. to the tactile layer 230 and the tactile surface 233.

In the foregoing implementation, the second sublayer 237 can alternatively be of a polymer material different from that of the first sublayer 235. For example, the first sublayer 235 can be of urethane of a first elasticity, and the second sublayer 237 can be of a polycarbonate-based material of a second elasticity less than the first elasticity. In this example, the first sublayer 235 can thus function as a buffer backing that absorbs sharp deformation of the tactile layer 230 proximal a perimeter of the deformable region, such as described above, and the second layer can yield improved abrasion resistance, gloss or sheen, tactile smoothness, etc. However, the working fluid 250 can be of any other liquid (or gas), and the tactile layer 230 can be of any other number of sublayers of any other material and geometry to limit uptake of working fluid into the tactile layer 230. However, the tactile layer 230 can be of any other form, any other material, and bonded to the substrate 210 within any other technique or method. The closing panel 212 and the substrate 210 can similarly be of any other suitable material can assembled within the second dynamic tactile interface 200 in any other suitable way.

The third method can therefore include Block S340, which recites filling the fluid channel 213B with a working fluid in Block S340. In one implementation, the closing panel 212 includes a draw port coupled to the fluid channel 213B at one end of the fluid channel 213B opposite the via 218. In this implementation, once the substrate 210, closing panel, tactile layer, and displacement device are assembled, a valve is connected between an inlet of the displacement device 240 (or connected reservoir) and an external reservoir containing working fluid. With the valve closed, gas (e.g., air) is then evacuated from the fluid channel 213B through the draw port. Once a threshold vacuum in reached within the fluid channel 213B, the valve is opened and working fluid is drawn from the external reservoir into the displacement device 240, through the via 218, and into the fluid channel 213B and fluid conduit. Any remaining gas within the second dynamic tactile interface 200 can be subsequently purged by supporting the second dynamic tactile interface 200 vertically with the draw port above the via 218 and displacing a small volume of working fluid into and out of the second dynamic tactile interface 200 to dislodge and draw remaining (air) bubbles out of the second dynamic tactile interface 200 through the draw port. The draw port is finally disconnected from the valve and sealed, and the displacement device 240 (or connected reservoir) is similarly sealed, thus isolating the working fluid 250 in the second dynamic tactile interface 200. However, Block S340 can function in any other way to evacuate gas from the fluid channel 213B, to inject working fluid into the second dynamic tactile interface 200, and/or to purge any remaining gas from the second dynamic tactile interface 200.

As shown in FIGS. 14A and 14B, one variation of the second dynamic tactile interface 200 includes a touch sensor 270 configured to output a signal corresponding to an input on the tactile surface 233. As described above, the touch sensor 270 can be a capacitive touch sensor, a resistive touch sensor, or any other suitable type of sensor arranged on or across a sensor panel.

In one implementation, the assembled substrate, closing panel, and substrate—hereinafter the "stack"—is bonded to the sensor panel. The third method can therefore include Block S350, which recites laminating the closing panel 212 opposite the substrate 210 to a touch sensor panel and curing the closing panel 212 and the touch sensor 270 panel under elevated pressure and elevated temperature, as shown in FIG. 15. In one example, the sensor panel includes a polymer sheet (e.g., a PMMA or glass sheet) patterned on each side with indium tin oxide (ITO) traces to form a capacitive touch sensor. In this example, an optically-clear adhesive (OCA) can be sprayed or rolled across the closing panel 212 opposite the substrate 210 and/or across a broad face of the sensor panel (and over the ITO traces), and the sensor panel and the stack can be laminated together. Alternatively, a sheet of uncured OCA can be inserted between the stack and the sensor panel. The stack, OCA, and sensor panel can then be cured, such as in an autoclave at a predefined temperature and pressure for a predefined period of time, to adhere the sensor panel to the stack. In this example, the peak temperate of the autoclave during the curing process can be kept substantially below a flow temperature, evaporation temperature, oxidation temperature, etc. of the ITO or other trace, feature, or material within the sensor panel to substantially eliminate potential for damage to the sensor panel during the assembly process. In particular, the substrate 210, the tactile layer 230, and the closing panel 212 can be assembled into the stack and cured before the sensor panel in bonded to the stack.

Alternatively, the closing panel 212 and the sensor panel can be physically coextensive, wherein the sensor panel is bonded directly to the substrate 210. For example, the touch panel can include a series of ITO traces patterned across each side of a urethane sheet, which is laminated to the substrate 210 and tactile layer assembly and cured in an autoclave at a peak temperate that does not yield substantially distortion or damage to the ITO traces, such as described above. However, the second dynamic tactile interface 200 can include a touch sensor of any other type and can be bonded or coupled to the closing panel 212 and/or substrate in any other suitable way.

As shown in FIG. 15, one variation of the second dynamic tactile interface 200 includes a display 280 bonded to the closing panel 212 opposite the tactile layer 230 with an optically-clear adhesive. Generally, the display 280 is configured to render an image of an input key proximal the deformable region, as described above. In one implementation, the display 280 is bonded directly to closing panel, such as by sandwiching a sheet of OCA between the stack and the display 280 and curing the OCA, as described above. One variation of the third method can therefore in include Block S352, which recites bonding a display to the touch sensor 270 panel opposite the closing panel 212 with an optically-clear adhesive. In this implementation, the display 280 can be a touchscreen that incorporates both a display and a (touch) sensor. Alternatively, in the variation of the second dynamic tactile interface 200 in which a touch sensor is bonded the closing panel 212, the display 280 can be bonded to the touch sensor 270 opposite the closing panel 212, such as by adhering the display 280 to the sensor panel with an OCA. In this implementation, the display 280 can be bonded to the sensor panel after or while the sensor is bonded to the stack. Alternatively, the display 280 and the sensor panel can be assembled and subsequently bonded to the stack, such as described above. However, the second mobile computing device can include any other type of display and/or touch sensor coupled or bonded to the substrate 210, tactile layer, and/or closing panel in any other suitable way.

The displacement device 240 of the second dynamic tactile interface 200 is configured to displace the working fluid 250 into the fluid channel 213B and through fluid conduit 214 to transition the deformable region 231 from a retracted setting to an expanded setting. As described above, the displacement device 240 generally functions to pump fluid into the fluid channel 213B transition the deformable region 231 from flush with the peripheral region 232 in the retracted setting and to offset from the peripheral region 232 in the expanded setting. In one implementation, the displacement device 240 is coupled to the via 218 in the closing panel 212, as described above. The third method can therefore include Block S342, which recites coupling the displacement device 240 to the via 218. For example, the displacement device 240 can include a positive displacement pump coupled to the via 218 by a flexible hose extending from the via 218.

Alternatively, the displacement device 240 can include a flexible membrane bonded to the closing panel 212 around the via 218 and opposite the substrate 210 to define a reservoir filled with the working fluid 250. In this implementation, the displacement device 240 can compress the flexible membrane to displace fluid through the via 218 and into the fluid channel 213B to transition the deformable region 231 into the expanded setting. However, the displacement device 240 can be of any other form and can be fluidly coupled to the fluid channel 213B in any other suitable way. The displacement device 240 can also transition the deformable region 231 of the tactile layer 230 to any other position above or below the peripheral region 232 of tactile layer.

However, the second dynamic tactile interface 200 can include any number of displacement devices and can define any number of vias, fluid channels, fluid conduits, valves, and/or deformable regions that can be selectively and intermittently transitioned between retracted and expanded settings to provide tactile guidance over any other suitable computing device. Similarly, the third method can implement any other method or technique to manufacture and assemble the second dynamic tactile interface 200.

As a person skilled in the art will recognize from the previous detailed description and from the figures and claims, modifications and changes can be made to the embodiments of the invention without departing from the scope of this invention as defined in the following claims.

We claim:

1. A dynamic tactile interface comprising:
a substrate comprising a first transparent material and defining an attachment surface, an open channel opposite the attachment surface, and a fluid conduit intersecting the open channel and passing through the attachment surface;
a tactile layer comprising a second transparent material and defining a tactile surface, a peripheral region bonded to the attachment surface opposite the tactile surface, and a deformable region adjacent the fluid conduit and disconnected from the attachment surface;
a closing panel bonded to the substrate opposite the attachment surface and enclosing the open channel to define a fluid channel;
a working fluid; and
a displacement device configured to displace the working fluid into the fluid channel and through the fluid conduit to transition the deformable region from a retracted setting to an expanded setting, the deformable region flush with the peripheral region in the retracted setting and offset from the peripheral region in the expanded setting.

2. The dynamic tactile interface of claim 1, wherein the fluid channel defines a curvilinear cross-section, and wherein the fluid conduit comprises a frustoconical section tapering toward the attachment surface.

3. The dynamic tactile interface of claim 1, wherein the tactile layer comprises a first sublayer, a barrier sublayer bonded to the first sublayer, and a second sublayer bonded to the barrier sublayer opposite the first sublayer, wherein the barrier layer is substantially impermeable to the working fluid, and wherein the first sublayer is selectively bonded to the attachment surface opposite the barrier sublayer.

4. The dynamic tactile interface of claim 3, wherein the working fluid comprises a silicone oil, and wherein the barrier layer is substantially impermeable to the silicone oil.

5. The dynamic tactile interface of claim 3, wherein the first sublayer comprises urethane defining a buffer backing of a first elasticity, and wherein the second sublayer comprises polycarbonate of a second elasticity less than the first elasticity.

6. The dynamic tactile interface of claim 1, wherein the closing panel comprises a touch sensor configured to output a signal corresponding to an input on the tactile surface.

7. The dynamic tactile interface of claim 6, further comprising a display bonded to the closing panel opposite the tactile layer with an optically-clear adhesive, the display configured to render an image of an input key proximal the deformable region.

8. The dynamic tactile interface of claim 1, wherein the substrate comprises the first transparent material comprising polycarbonate of a first elasticity, wherein the tactile layer comprises the second transparent material comprising a urethane of a second elasticity greater than the first elasticity, and wherein the closing panel comprises a third transparent material comprising a urethane of a third elasticity less than the second elasticity.

9. The dynamic tactile interface of claim 1, further comprising an ink bezel arranged about a perimeter of the attachment surface between the substrate and the tactile layer.

10. The dynamic tactile interface of claim 1, wherein the substrate defines a second open channel opposite the attachment surface and parallel to the fluid channel, defines a second fluid conduit intersecting the second open channel and passing through the attachment surface adjacent the fluid conduit, and cooperates with the closing panel to enclose the second open channel to define a second fluid channel, wherein the deformable region is arranged over the fluid conduit and the second fluid conduit, and wherein the displacement device is further configured to displace the working fluid into the second fluid channel and through the second fluid conduit to transition the deformable region from the retracted setting to the expanded setting.

11. A method for manufacturing a dynamic tactile interface comprising:
creating an open channel in an interior surface of a substrate comprising a first transparent material and defining an attachment surface opposite the interior surface;
creating a fluid conduit intersecting the open channel and passing through the attachment surface of the substrate;
activating the attachment surface;
selectively bonding a peripheral region of a tactile layer to the attachment surface, the tactile layer comprising a second transparent material and defining a deformable region disconnected from the attachment surface proximal the fluid conduit;
activating the interior surface;
bonding a closing panel to the interior surface to enclose a portion of the open channel to define a fluid channel;
coupling a displacement device to the fluid channel; and
filling the fluid channel with a working fluid.

12. The method of claim 11, wherein creating the fluid conduit in the substrate comprises machining a frustoconical bore from the fluid channel through to the attachment surface of the substrate.

13. The method of claim 11, wherein activating the attachment surface comprises treating the attachment surface with nitrogen surface activation.

14. The method of claim 11, wherein selectively bonding the tactile layer to the attachment surface comprises laminating the tactile layer to the substrate and curing the tactile layer and the substrate under elevated temperature.

15. The method of claim 11, further comprising laminating the closing panel opposite the substrate to a touch sensor panel and curing the closing panel and the touch sensor panel under elevated pressure and elevated temperature.

16. The method of claim 15, further comprising bonding a display to the touch sensor panel opposite the closing panel with an optically-clear adhesive.

17. The method of claim 11, further comprising applying an ink bezel around a perimeter of the attachment surface, wherein selectively bonding the tactile layer to the attachment surface comprises bonding the tactile layer to the ink bezel.

18. The method of claim 11, further comprising creating a via through the closing panel prior to bonding the closing panel to the interior surface, wherein bonding the closing panel to the interior surface comprises aligning the via with the fluid channel, and wherein coupling the displacement device to the fluid channel comprising coupling the displacement device to the via.

19. The method of claim 11, further comprising selectively applying a mask to the attachment surface proximal the fluid conduit prior to bonding the tactile layer to the attachment surface.

20. The method of claim 11, wherein filling the fluid channel with the working fluid comprises evacuating air from the fluid channel, injecting the working fluid into the fluid channel, and purging remaining air from the fluid channel.

21. A dynamic tactile interface comprising:
a substrate comprising a first transparent material and defining an attachment surface and a fluid conduit intersecting the open channel and passing through the attachment surface;
a tactile layer comprising a second transparent material and defining a tactile surface, a peripheral region bonded to the attachment surface opposite the tactile surface, and a deformable region adjacent the fluid conduit and disconnected from the attachment surface;
a closing panel defining an open channel opposite the attachment surface, bonded to the substrate opposite the attachment surface, and cooperating with the substrate to enclose the open channel to define a fluid channel;
a working fluid; and
a displacement device configured to displace the working fluid into the fluid channel and through the fluid conduit to transition the deformable region from a retracted setting to an expanded setting, the deformable region flush with the peripheral region in the retracted setting and offset from the peripheral region in the expanded setting.

22. The dynamic tactile interface of claim 21, wherein the tactile layer comprises a first sublayer and a second sublayer, the first sublayer selectively bonded to the attachment surface and of a first elasticity, the second sublayer bonded to the first sublayer opposite the substrate and of a second elasticity less than the first elasticity.

* * * * *